United States Patent
Jenkins et al.

(10) Patent No.: US 9,794,130 B2
(45) Date of Patent: Oct. 17, 2017

(54) SYSTEM, APPARATUS, PROCEDURE, AND COMPUTER PROGRAM PRODUCT FOR PLANNING AND SIMULATING AN INTERNET PROTOCOL NETWORK

(71) Applicant: Coriant Operations, Inc., Naperville, IL (US)

(72) Inventors: David W. Jenkins, North Aurora, IL (US); Jonathan R. Abon, Morton Grove, IL (US); Ramasubramanian Anand, Plainfield, IL (US); Kenneth M. Fisher, Aurora, IL (US)

(73) Assignee: Coriant Operations, Inc., Naperville, IL (US)

( * ) Notice: Subject to any disclaimer, the term of this patent is extended or adjusted under 35 U.S.C. 154(b) by 259 days.

(21) Appl. No.: 13/714,204

(22) Filed: Dec. 13, 2012

(65) Prior Publication Data
US 2014/0169187 A1   Jun. 19, 2014

(51) Int. Cl.
*H04L 12/24* (2006.01)
*H04L 12/26* (2006.01)

(52) U.S. Cl.
CPC ............ *H04L 41/145* (2013.01); *H04L 43/04* (2013.01)

(58) Field of Classification Search
USPC ................................................. 370/252, 254
See application file for complete search history.

(56) References Cited

U.S. PATENT DOCUMENTS

| | | | |
|---|---|---|---|
| 7,324,553 B1 * | 1/2008 | Varier | H04L 41/0896 370/235 |
| 2006/0168205 A1 * | 7/2006 | Barron et al. | 709/224 |
| 2007/0058631 A1 * | 3/2007 | Mortier et al. | 370/392 |
| 2009/0187795 A1 * | 7/2009 | Doverspike | H04L 43/02 714/43 |
| 2010/0020685 A1 * | 1/2010 | Short et al. | 370/230 |
| 2010/0061260 A1 * | 3/2010 | Bugenhagen | 370/252 |
| 2011/0110248 A1 * | 5/2011 | Koitabashi et al. | 370/252 |
| 2011/0122776 A1 * | 5/2011 | Jacob | H04L 41/145 370/250 |
| 2011/0153554 A1 * | 6/2011 | Cohen | H04L 43/028 707/607 |
| 2012/0079101 A1 * | 3/2012 | Muppala | H04L 47/2441 709/224 |
| 2012/0140671 A1 * | 6/2012 | Bukofser | H04L 41/12 370/253 |

(Continued)

Primary Examiner — Hassan Kizou
Assistant Examiner — Deepa Belur
(74) Attorney, Agent, or Firm — Merchant & Gould, P.C.

(57) ABSTRACT

A procedure for evaluating a network, and a system, apparatus, and computer program that operate in accordance with the procedure. The procedure includes aggregating packet information from one or more sources in a network, and executing a correlation algorithm to determine traffic flow information based on the packet information. The aggregating includes obtaining information from a header of a packet being communicated in the network, in one example embodiment. In another example, the executing includes tracing a traffic flow from a source node to a destination node, and the tracing includes determining, based on the packet information, each link by which the traffic flow is communicated from the source node to the destination node.

18 Claims, 16 Drawing Sheets

(56) References Cited

U.S. PATENT DOCUMENTS

| | | | |
|---|---|---|---|
| 2013/0058235 A1* | 3/2013 | Johnsson | H04L 12/2697 370/252 |
| 2013/0322299 A1* | 12/2013 | Choi | H04L 12/462 370/256 |
| 2014/0133349 A1* | 5/2014 | Ninan et al. | 370/254 |
| 2014/0310417 A1* | 10/2014 | Sorenson et al. | 709/226 |

\* cited by examiner

900

1400

1500

1600

SYSTEM, APPARATUS, PROCEDURE, AND COMPUTER PROGRAM PRODUCT FOR PLANNING AND SIMULATING AN INTERNET PROTOCOL NETWORK

BACKGROUND

Field

Example aspects described herein relate generally to communication network design, and more particularly, to a system, apparatus, procedure, and computer program product for evaluating a network.

Description of Related Art

In order to provide maximum use of communication networks at minimum cost, networks are typically planned based on three types of information:

(1) information regarding network elements (nodes) containing relevant telecommunications equipment, (2) information regarding links between the nodes, and (3) information regarding the volume (e.g., as indicated by an amount of bandwidth) and path(s) (active and/or protection) of each traffic flow.

In transport networks, these types of information are known and are the basis for planning new networks and growing existing networks. Transport traffic is circuit-based and consists of traffic flows that are defined along a path that, by design, remains unchanged and thus does not experience congestion. That is, transport traffic is provisioned by the service provider (e.g., a network operator) between endpoints, and remains static until either a protection event occurs or the traffic is changed by the service provider. Traffic flows and volumes remain static in capacity and routing for long periods of time, months or years.

Traffic flows that are static in terms of volume and route have several benefits, such as a tendency not to become congested and not to be re-routed. Protection paths are provisioned and are not used for other traffic. Additional traffic can be added to an existing network without concern for affecting existing traffic. In short, with transport networks, the network behavior and traffic flows are predictable.

In contrast, Internet Protocol (IP) networks are self-organizing networks and are therefore not as predictable. Flows in IP networks are not provisioned by service providers. In IP networks, end users choose a source and a destination for traffic, and IP routers route the traffic from the source to the destination. The service provider typically does not know the individual traffic flows in terms of volume or route. Further, IP traffic flows may not be not long-lived and may last as short as seconds or minutes. There are also no mechanisms to prevent traffic from overloading a particular link or router. In cases where this happens, the routers may change the path for particular flows. However, this inherent protection scheme for IP traffic does not choose pre-defined routes, so any capacity that a network planner may have allotted for protection traffic, may not actually be used for protection traffic.

For IP networks, traffic can become congested, traffic can re-route, allotted protection paths can be used for other traffic, and new traffic cannot be added to the network without concern for affecting existing traffic. This creates difficulty for network planners and network operators. Congestion may occur at any time and in some cases may occur at regular times of the day. For example, enterprise traffic may be prevalent during daylight hours while a higher volume of entertainment traffic may occur in the evening, thereby causing daily shifts in traffic flows. Traffic flows can also be impacted by events, such as weather events that disable links or human events like sporting events or political events that can give rise to a change in traffic patterns.

Current approaches to planning IP networks are based on the determination of an aggregate amount of traffic passing through each link of a network. Use of the links is adjusted by using weightings in the routing scheme, such as a scheme called Open Shortest Path First (OSPF). However, this approach often does not sufficiently account for the unpredictable and changing traffic flows in an IP network.

SUMMARY

Existing limitations associated with the foregoing, as well as other limitations, can be overcome by a procedure for evaluating a network, and by a system, apparatus, and computer program product that operate in accordance with the procedure.

In one example embodiment herein, the procedure includes aggregating packet information from one or more sources in a network, and executing a correlation algorithm to determine traffic flow information based on the packet information.

The one or more sources include, in one example, at least one of a network element and/or an element management system. In some example embodiments herein, the network element includes at least one of a wireless base station, a router, a server, a base station controller, and/or a radio network controller.

The packet information include, in another example embodiment, at least one of a packet identifier, link information, source node information, destination node information, and/or bandwidth information for a packet in the network.

The traffic flow information includes, for example, information identifying at least one of a source node, a destination node, or one or more intermediate nodes, a bandwidth, and/or a path for a traffic flow in the network.

According to another example embodiment, the aggregating includes obtaining information from a header of a packet being communicated in the network.

Also in one example embodiment herein, the executing includes tracing a traffic flow from a source node to a destination node. The tracing can include, in one example, determining, based on the packet information, each link by which the traffic flow is communicated from the source node to the destination node. In another example, the tracing can include determining whether the traffic flow is bifurcated by comparing a plurality of bandwidths for the traffic flow at a plurality of links, respectively, by which the traffic flow is communicated.

In another example embodiment herein, the procedure further comprises obtaining network configuration information from the one or more sources in the network.

According to another example embodiment herein, the procedure further comprises determining, based on the packet information, a capacity currently being used for a link in the network.

In a further example embodiment herein, the procedure includes determining, based on the packet information, a capacity currently available for a link in the network.

The procedure also can include executing one or more planning or simulation algorithms based on at least one of the packet information and/or the traffic flow information.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, wherein:

DETAILED DESCRIPTION

Figure 1:
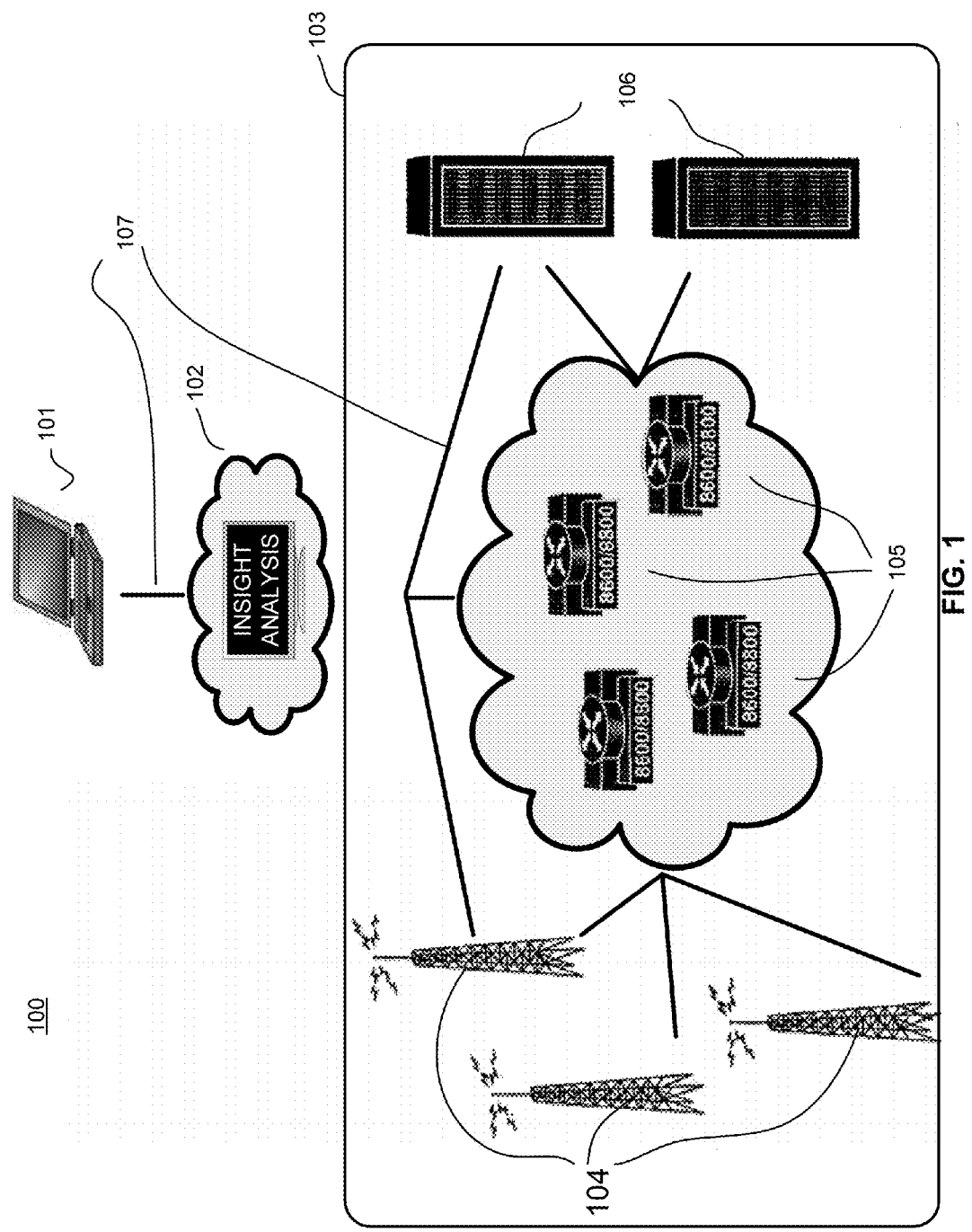
FIG. 1 is a representation of an example system for planning and simulating an IP network that is constructed and operated in accordance with at least one example embodiment described herein.

Presented herein is a novel and inventive procedure, and also a system, apparatus, and computer program product that operate in accordance with the procedure, for planning and simulating an IP network.

Except as indicated elsewhere herein, the terms "network operator", "network planner", "service provider", and "user" may be used interchangeably herein to refer to a user (whether one or more individuals and/or entities) of the procedure, system, apparatus, and computer program product described herein. The terms "flow" or "traffic flow" as used herein generally refers to network traffic (e.g., one or more packets) that is communicated from a source node to a destination node via a path that includes one or more links, and which may, or may not, be communicated from the source node to the destination node by way of one or more intermediate nodes. The term "link", as used herein, refers to a communicative coupling between two adjacent communication devices (e.g., nodes), by which the devices can transmit and/or receive traffic to/from each other.

According to one example aspect herein, an IP network planning and simulation procedure is provided that enables a user to effectively plan and simulate an IP network through the use of a correlation algorithm that determines volumes and paths of individual traffic flows based on an examination of individual IP packets. In one example aspect herein, the procedure includes examining traffic flows by collecting data (e.g., network configuration information, packet information, etc.) from network elements, EMSs, OSSs, and/or other sources. The network configuration information is correlated with the packet information to obtain an accurate view of the network traffic behavior, which can be dynamic since nodes in a packetized network may make decisions (e.g., routing decisions, etc.) to adapt to changing traffic demands.

Additionally, through the use in IP networks of various circuit-based protocols, such as different types of virtual private network (VPN) protocols and different types of multiprotocol label switching (MPLS), a user can redirect individual traffic flows based on results of network planning and/or simulation.

In some example embodiments, the procedure herein enables a user or network operator to plan or provision IP network traffic based on existing traffic flows, taking into account default transmission paths and protection paths.

According to another example aspect herein, the procedure enables a user to execute a simulation of congestion and/or failure of an IP network and then plan (or re-plan) the IP network to ensure that the IP network can avoid such congestion and perform reliably in the event of such failures.

According to another example aspect, the procedure herein can enable a user to plan and/or simulate an IP network based on traffic flows measured through a span of time, such as, for example, a relatively short time window (e.g., hours) or a relatively long time window (e.g., months). In this way, a user may plan the network to accommodate short term traffic patterns and/or long term traffic patterns.

FIG. 1 is a representation of an example system 100 for planning and simulating an IP network that is constructed and operated in accordance with at least one example embodiment described herein. The system 100 includes a user computing and/or communication device 101 (e.g., a personal computer, a laptop computer, a mobile telephone, and/or the like) communicatively coupled to a communication network 103 (e.g., an IP network) by way of one or more links 107 and an analytics server 102.

In one example embodiment, the network 103 represents an IP network, although the network 103 can also represent other types of networks, such as, by example only, another type of packetized network, an optical transport mesh network, a virtual private network, and/or the like.

The network 103 includes a plurality of network elements (nodes), such as wireless base stations 104, routers 105, and/or other servers 106 (e.g., a base station controller (BNC), a radio network controller (RNC), and/or the like) that are mutually interconnected via paths that, in one example, include one or more links 107. According to one example embodiment, each link 107 includes one or more optical fibers able to carry dense wavelength division multiplexed (DWDM) optical signals thereon, but this example should not be construed as limiting. In other example embodiments, one or more of the links 107 can include and/or represent a wireless communicative coupling and/or a wired communicative coupling (e.g., an Ethernet coupling), and the signals communicated throughout the system 100 can include optical signals, electrical signals, and/or electromagnetic signals.

Example types of paths that may be employed in the network 103 include an active path, a protection path, and a restoration path. An active path is a default path (i.e., the paths used in the absence of any associated network failure) by which the particular type of traffic is communicated between the corresponding nodes. A protection path is an alternate path between the nodes which can be quickly switched into (by, e.g., one or more optical and/or electrical switches included at a particular node, not shown in FIG. 5) in the event of a failure of the associated active path. A restoration path is an alternate path between the nodes which can be switched into use, but may require more time to be switched into use than a protection path, in the event of a failure of the associated active path. In one example embodiment, whether a node is capable of supporting a protection path or a restoration path depends on the type of switch(es) (fast switches or slow switches) included in the node. A protection path may be required for important traffic and/or traffic that requires fast switching. For example, for telephone traffic, if an active path experiences a failure, the network should quickly (e.g., in less than 50 milliseconds) switch to an alternate path (i.e., a protection path) because otherwise the telephone call may be dropped. In contrast, for Internet traffic, if an active path experiences a failure, it may be sufficient for the network to switch to an alternate path (i.e., a restoration path) more slowly because there is no risk of dropping a telephone call.

As will be described in further detail below in the context of FIGS. 6 and 7, in at least some example embodiments the user device 101 is configured to execute an application that enables a user to plan and/or simulate an IP network. Also, the analytics server 102 is configured to host an application (e.g., a web-based application) that aggregates network-related information (e.g., packet information) from one or more sources (e.g., the plurality of network elements (104, 105, and/or 106)), executes a correlation algorithm based on the aggregated packet information to generate traffic flow information, and provides the traffic flow information to the application executed by the user device 101 to enable a user or network operator to plan and/or simulate the network 103 based on the information aggregated by the analytics server 102. In other example embodiments, those functions may all be performed by the user device 101, or another network element, or they may be shared among the server 102 and device 101, and/or other network element.

The term "network-related information" generally refers to information regarding a network. In one example embodiment, network-related information includes one or more of topology information (i.e., an arrangement of the various components (e.g., nodes, links) of a network), capacity information (e.g., a capacity of each node of a network, a capacity of each link of a network), traffic flow information (e.g., a source, destination, and path for each packet of IP traffic), status information (e.g., alarm, fault, and/or failure indications), utilization information (e.g., percentage utilization for link(s) and/or node(s)), network traffic priority information, and/or predetermined protection and/or restoration path information.

In other example embodiments, network-related information can include other information, such as, for example, one or more of a management information base (MIB) file, performance information, packet discard information, throughput information, node configuration information (e.g., types of equipment included in node(s)), link configuration information, traffic demand information, alarm location information, network policy information, base station and/or RNC reference data, a base station name, a base station IP address, an area name, a trunk group name, a medium type for a link, microwave node reference data, a node name, a radio IP address, a transceiver radio state, a telnet command line interface (CLI), path information such as a label switched path (LSP), circuit information, pseudowire emulation (PWE) information, simple network management protocol (SNMP) information, link operational state information (e.g., errored second (ES), severely errored second (SES)), link radio payload information, link radio data rate information, traffic demand information, a geographical location of each node, a geographical location of each link, a length of each link, a statistical availability of each link and/or node (i.e., a statistically determined numerical probability that a particular link and/or node will be functional at any given point), a type of optical fiber used for each link, an optical signal-to-noise ratio of each link and/or node, one or more other optical characteristics of each link and/or node, an optical loss of each link and/or node, a polarization mode dispersion number of each link and/or node, a chromatic dispersion number of each link and/or node, one or more types of components included as part of a node, one or more routing capabilities (e.g., fast switching or slow switching) of each node, one or more predetermined failure thresholds for triggering recovery of the network, (e.g., an alarm count, an alarm type, an event criteria (such as a performance criteria), a delay timer, etc.), and/or any other information relating to each link, node, or any other network component, and/or other suitable types of information depending on applicable operating criteria.

In another example embodiment, the network-related information can include one or more demands for protection for a particular traffic flow. For example, the network-related information can include a protection objective that indicates, for example, that three mesh paths are required for a particular type of traffic between a particular pair of nodes, with one mesh path being an active path, one being a protection path, and one being a restoration path, although this example combination of mesh paths is exemplary and should not be construed as limiting. In general, a protection objective can indicate the requirement of any combination of active, protection, and/or restoration paths. The network-related information can include a separate bandwidth amount for each path. For example, the network-related information can include an active bandwidth of 10 Gb/s for an active path, a protection bandwidth of 8 Gb/s for a protection path, and a restoration bandwidth of 5 Gb/s for a restoration path. In this example, only a portion (i.e., 8 Gb/s) of the bandwidth of the active path is protected by the protection path, and an even smaller portion (i.e., 5 Gb/s) of the bandwidth of the active path is protected by the restoration path. Additionally, in one example embodiment, restoration paths can be shared among multiple pairs of nodes.

Figure 2:
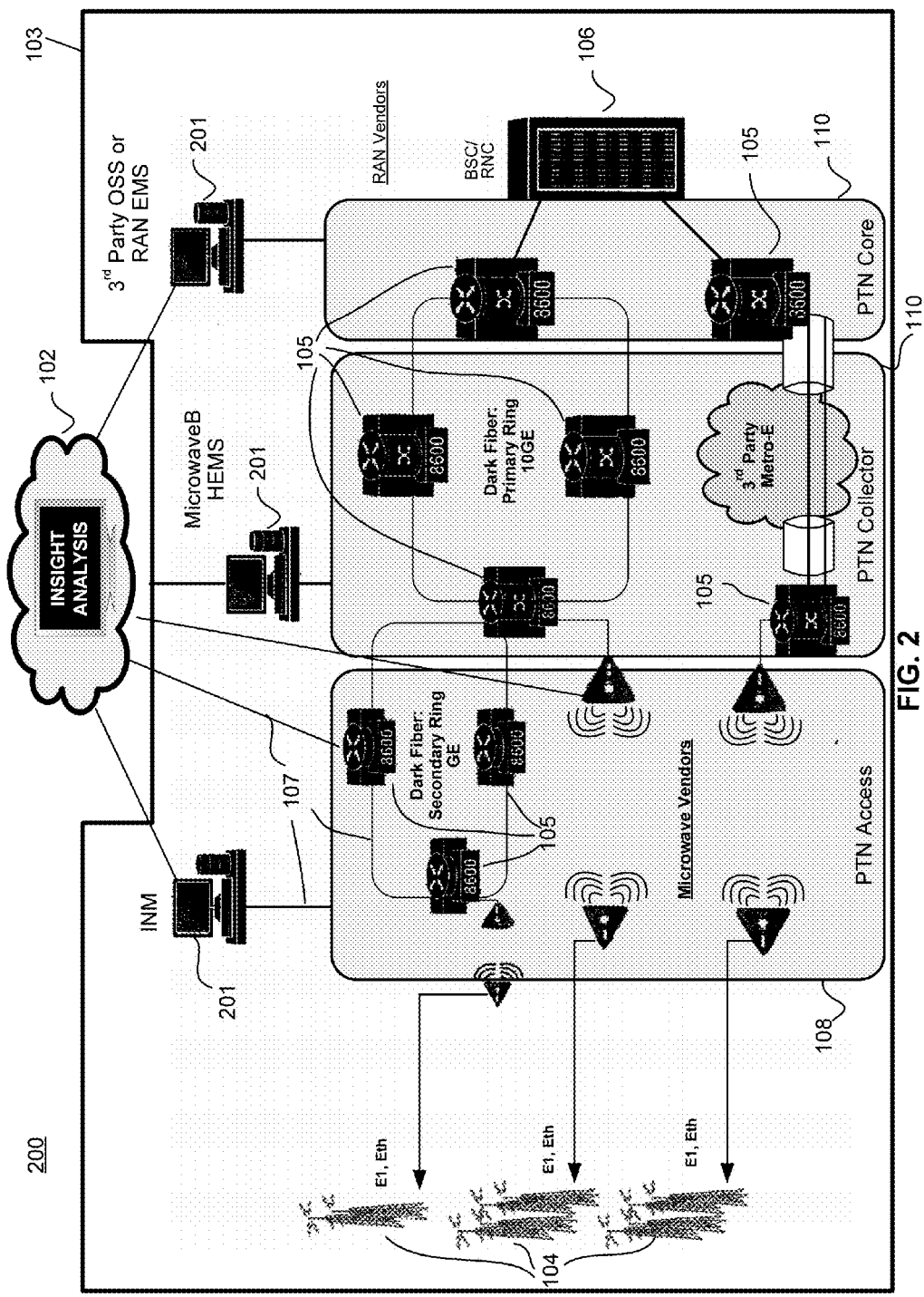
FIG. 2 is a further representation of an example system for planning and simulating an IP network that is constructed and operated in accordance with at least one example embodiment described herein.

FIG. 2 is a representation of an example system 200 for planning and simulating an IP network that is constructed and operated in accordance with at least one example embodiment described herein. In one example embodiment, the system 200 of FIG. 2 can represent in further detail the system 100 described above in the context of FIG. 1.

As shown in FIG. 2, in addition to being communicatively coupled to the servers 104, 105, and 106 themselves, the analytics server 102 also can be communicatively coupled to various types of element management servers (EMSs) 201 that are each communicatively coupled to one or more of the servers 104, 105, and/or 106 included in one or more subnetworks 108, 109, and/or 110. Example types of EMSs that may be included in network 103 include an intelligent network manager (INM), a microwave backhaul EMS, a third party operational support system (OSS), and/or a radio access network (RAN) EMS. In one example embodiment, the analytics server 102 is communicatively coupled to (1) a packet transport network (PTN) access network 108 by way of a first EMS 201 (e.g., an INM), (2) a PTN collector network 109 by way of a second EMS 201 (e.g., a microwave backhaul EMS), and a PTN core network 110 by way of a third EMS 201 (e.g., a third party OSS and/or RAN EMS).

In some example embodiments, each EMS 201 includes a user interface (such as, e.g., a user interface 418 described below) that enables a user to interact with the EMS 201 to perform one or more network management operations for a corresponding portion of the network 103 (e.g., including one or more network elements 104, 105, and/or 106) to which the particular EMS 201 is communicatively coupled, such as a corresponding subnetwork 109, 109, or 110. Example types of network management operations that the EMS 201 may be used to perform include, without limitation, network provisioning and/or re-provisioning, network monitoring, network troubleshooting, disabling a link, registering (or de-registering) one or more pieces of equipment that have been added to a node, modifying a network policy, and/or the like.

Each EMS 201 is configured to obtain one or more signals from, and/or to transmit one or more signals to, each of the other network elements and the analytics server 102 via one or more links 107. In one example embodiment, EMS 201 is configured to obtain network-related information (e.g., as described above) from one or more of the network elements 104, 105, and 106, and to transmit one or more control signals to one or more of the network elements 104, 105, and 106, by using a predetermined communication protocol (e.g., a command language).

Figure 3:
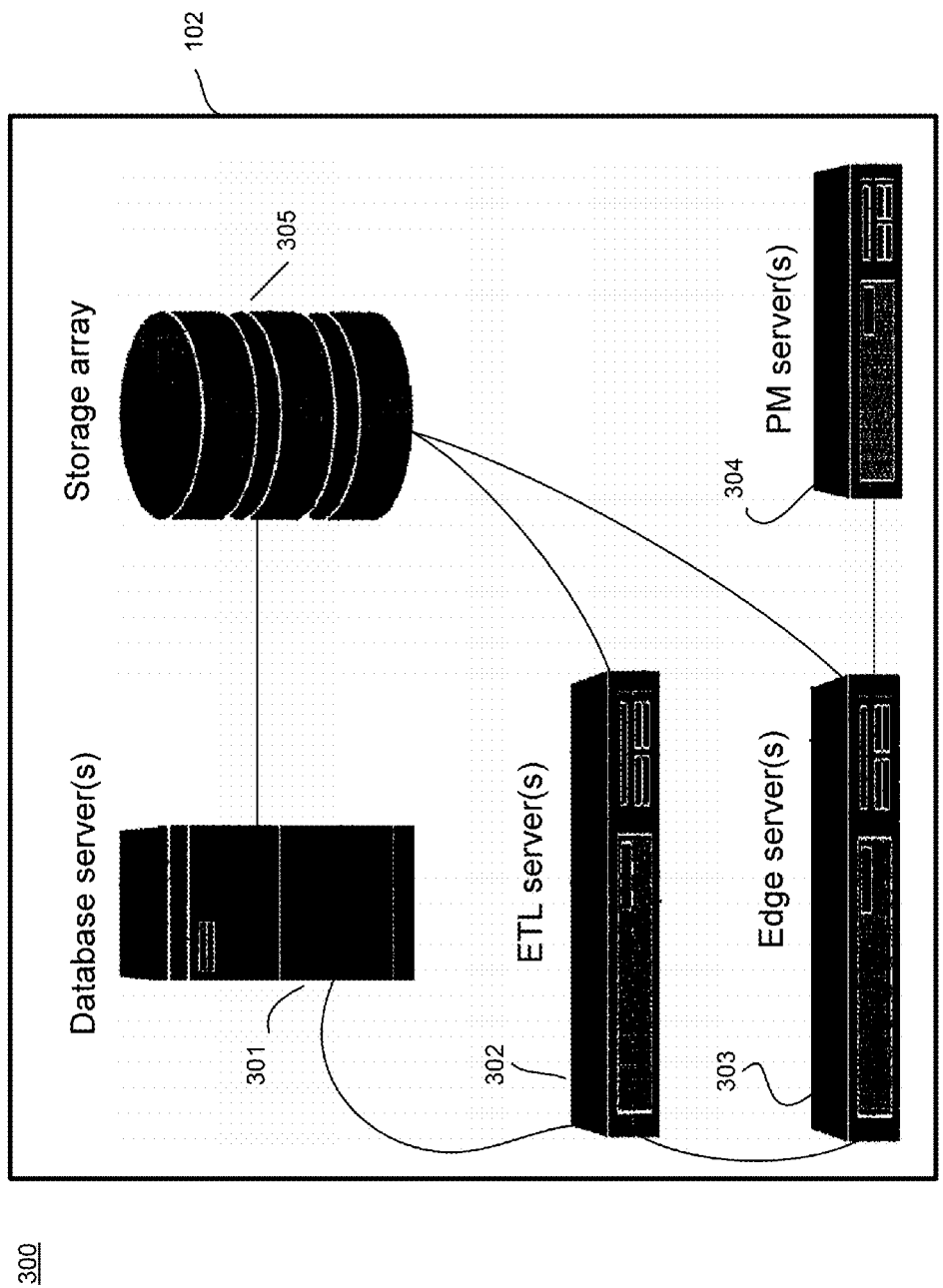
FIG. 3 is a representation of an apparatus for planning and simulating an IP network that is constructed and operated in accordance with at least one example embodiment described herein.

FIG. 3 is a representation of an analytics server 300 that is constructed and operated in accordance with at least one example embodiment described herein. In at least some example embodiments, the analytics server 300 further represents or can be included in the analytics server 102 described above in the context of FIGS. 1 and 2.

The analytics server 300 includes a database server 301; an extract, transform, and load (ETL) server 302; an edge server 303; one or more performance monitoring (PM) servers 304; and a storage array 305 (e.g., a database). The edge server 303 provides a physical and logical interface to the network 103. The edge server 303 interfaces directly with nodes, EMSs, and/or OSSs to obtain network-related information (e.g., traffic flow information, IP packet information, and topological information) from the network 103. The PM server 304 is a type of edge server that obtains statistical information (e.g., packet discards, throughput, utilization, and/or other performance statistic parameters) from the network 103. In some example embodiments, the statistical information can be correlated to topological information. The ETL server 302 provides a mechanism for parsing through all of the information being collected by the analytics server 102 and formatting the information into a format that database server 301 can import (e.g., a comma separated value (CSV) file). The database server 301 correlates the information and formats it into a format suitable for reporting purposes, to enable a user or operator to query, generate, and view different graphs and reports based on the information.

The storage array 305 houses data (raw data, parsed data, correlated data and reports) to enable historical analyses. That data can be provided to the array 305 from the other components of server 300, and can be retrieved from the array 305 by those components.

Figure 4:
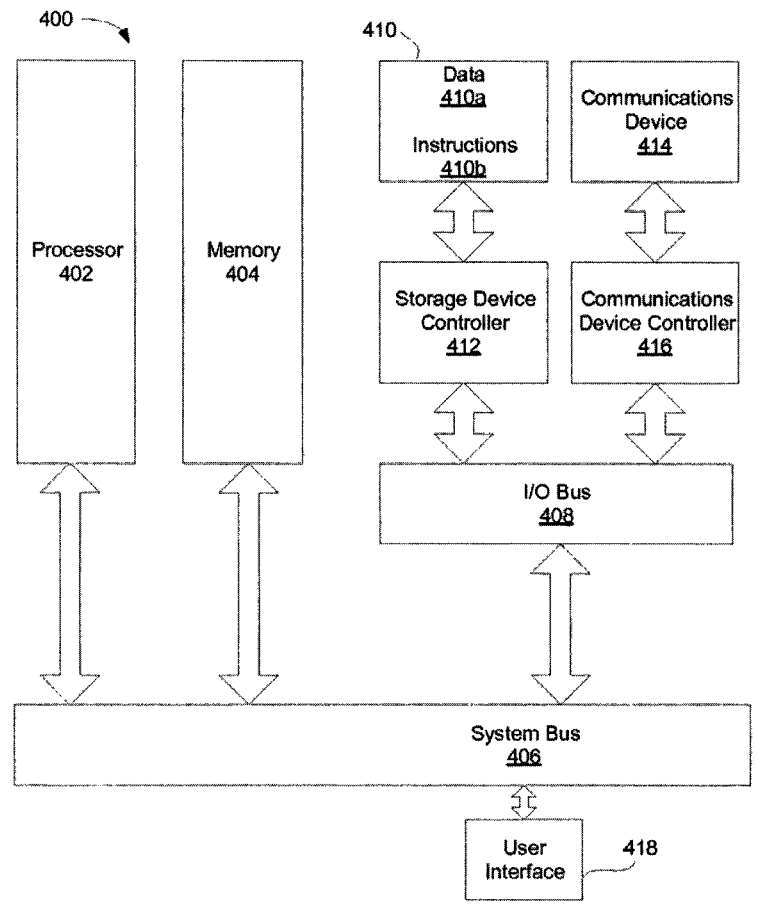
FIG. 4 is an architecture diagram of an example data processing system, which can be used according to various example embodiments described herein.

Reference is now made to FIG. 4, which is an architecture diagram of an example data processing system 400, which can be used according to various aspects herein. In one example embodiment, system 400 may further represent, and/or be included in, individual ones of the components of FIG. 1, 2, 3, 5, and/or 8 through 13 (e.g., 101, 102, 104, 105, 106, 201, 301, 302, 303, 304, 501, 502, and/or one or more nodes of FIGS. 8 through 13). Data processing system 400 can be used to simulate congestion and/or failure of a network, such as the IP network 500 described below, in one example. Data processing system 400 includes a processor 402 coupled to a memory 404 via system bus 406. Processor 402 is also coupled to external Input/Output (I/O) devices (not shown) via the system bus 406 and an I/O bus 408, and at least one input/output user interface 418. Processor 402 may be further coupled to a communications device 414 via a communications device controller 416 coupled to the I/O bus 408 and bus 406. Processor 402 uses the communications device 414 to communicate with other elements of a network, such as, for example, network nodes, and the device 414 may have one or more input and output ports. Processor 402 also may include an internal clock (not shown) to keep track of time, periodic time intervals, and the like.

A storage device 410 having a computer-readable medium is coupled to the processor 402 via a storage device controller 412 and the I/O bus 408 and the system bus 406. The storage device 410 is used by the processor 402 and controller 412 to store and read/write data 410a, as well as computer program instructions 410b used to implement the procedure(s) described herein and shown in the accompanying drawing(s) herein (and, in one example, to implement the functions represented in FIG. 6 and/or FIG. 7). The storage device 410 also can be used by the processor 402 and the controller 412 to store other types of data, such as, by example only, network-related information, as described above. In operation, processor 402 loads the program instructions 410b from the storage device 410 into the memory 404. Processor 402 then executes the loaded program instructions 410b to perform any of the example procedure(s) described herein, for operating the system 400.

Figure 5:
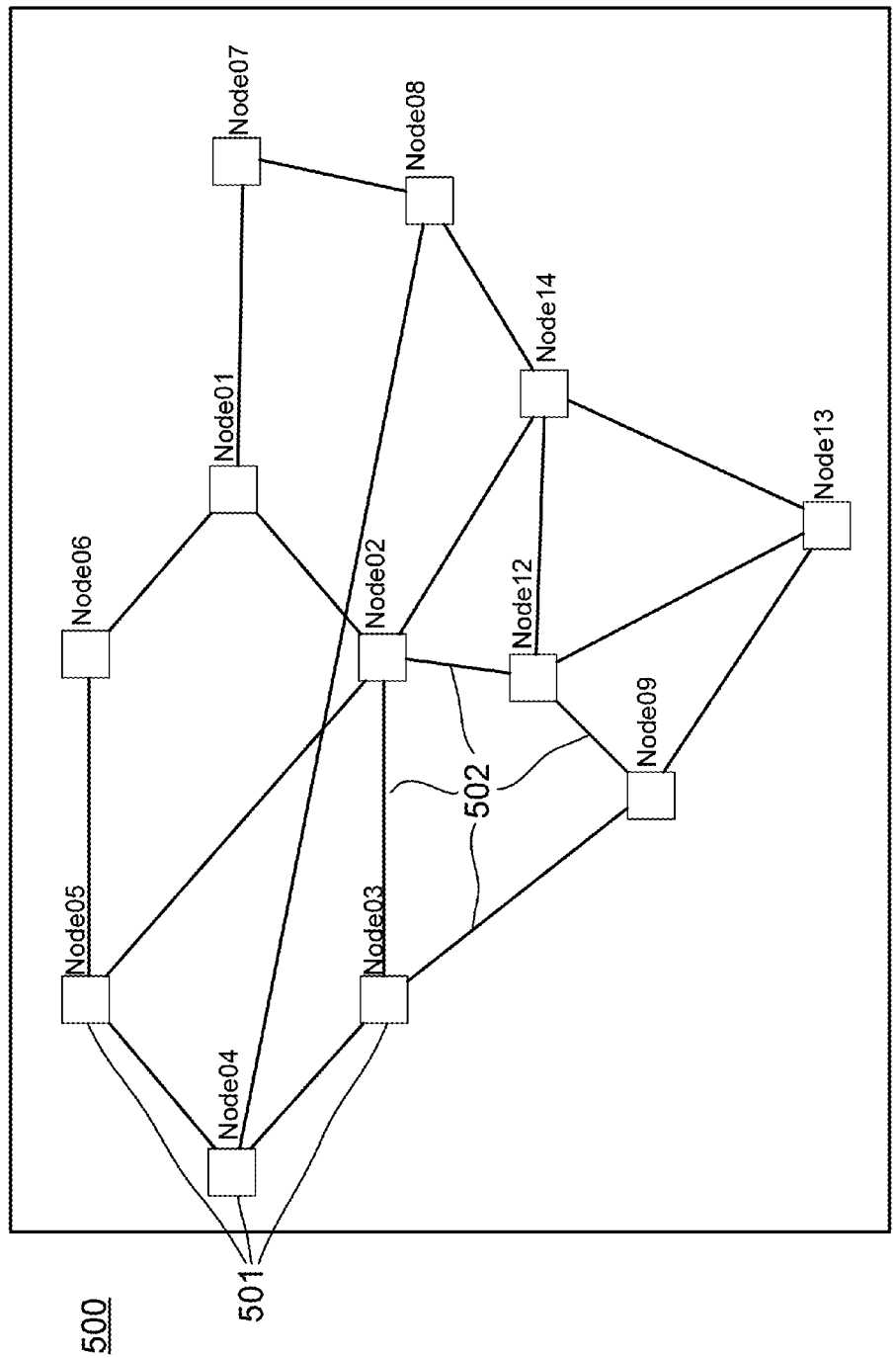
FIG. 5 is a representation of an example communication network that is constructed an operated in accordance with at least one example embodiment described herein.

FIG. 5 is a representation of an example communication network 500 that is constructed and operated in accordance with at least one example aspect herein. In one example embodiment, the network 500 represents an IP network, although the network 500 can also represent other types of networks, such as, by example only, any other type of packetized network, an optical transport mesh network, a virtual private network, and/or the like.

The network 500 includes a plurality of nodes 501 (also referred to herein as "network elements") each representing or including one or more optical signal transmitters, receivers, and/or transceivers configured to transmit and/or receive network traffic signals, such as, by example only, optical signals and/or electrical signals. Although not shown in FIG. 5 for purposes of convenience, each node may also include additional equipment (which can be optical, electrical, and/or opto-electrical), such as, by example only, one or more multiplexers, routers, switches, wavelength selective switches, amplifiers, filters, processors, waveguides, reconfigurable optical add/drop multiplexers (ROADMs), opto-electrical converters, and/or the like. Additionally, in some example embodiments, the nodes 501 further represent components of the networks of FIGS. 1 through 3, such as, by example only, the network elements 104, 105, 106, and/or EMS(s) 201 described above in the contexts of FIGS. 1 through 3.

Each of the nodes 501 is communicatively coupled to one or more of the other nodes 501 via a path, which may, for example, include one or more links 502. In one example embodiment, each link 502 includes one or more optical fibers able to carry dense wavelength division multiplexed (DWDM) optical signals thereon, but this example should not be construed as limiting. In other example embodiments, each link 502 can represent and/or include a wireless communicative coupling and/or a wired communicative coupling, and the signals communicated through the network 500 can include optical signals, electrical signals, and/or electromagnetic signals.

The specific topology of the network 500 of FIG. 5 is provided for illustration purposes only, and should not be construed as limiting. Additionally, the particular number of components shown in the network 500 of FIG. 5 is provided for illustration purposes only, and should not be construed as limiting. Additionally, although not shown in FIG. 5 for purposes of convenience, the network 500 may also include one or more components (e.g., 101, 102, 103, 104, 105, 106, 201, 301, 302, 303, and/or 304) of systems 100, 200, and/or 300 described herein in the context of FIGS. 1, 2, and 3, respectively.

Figure 6:
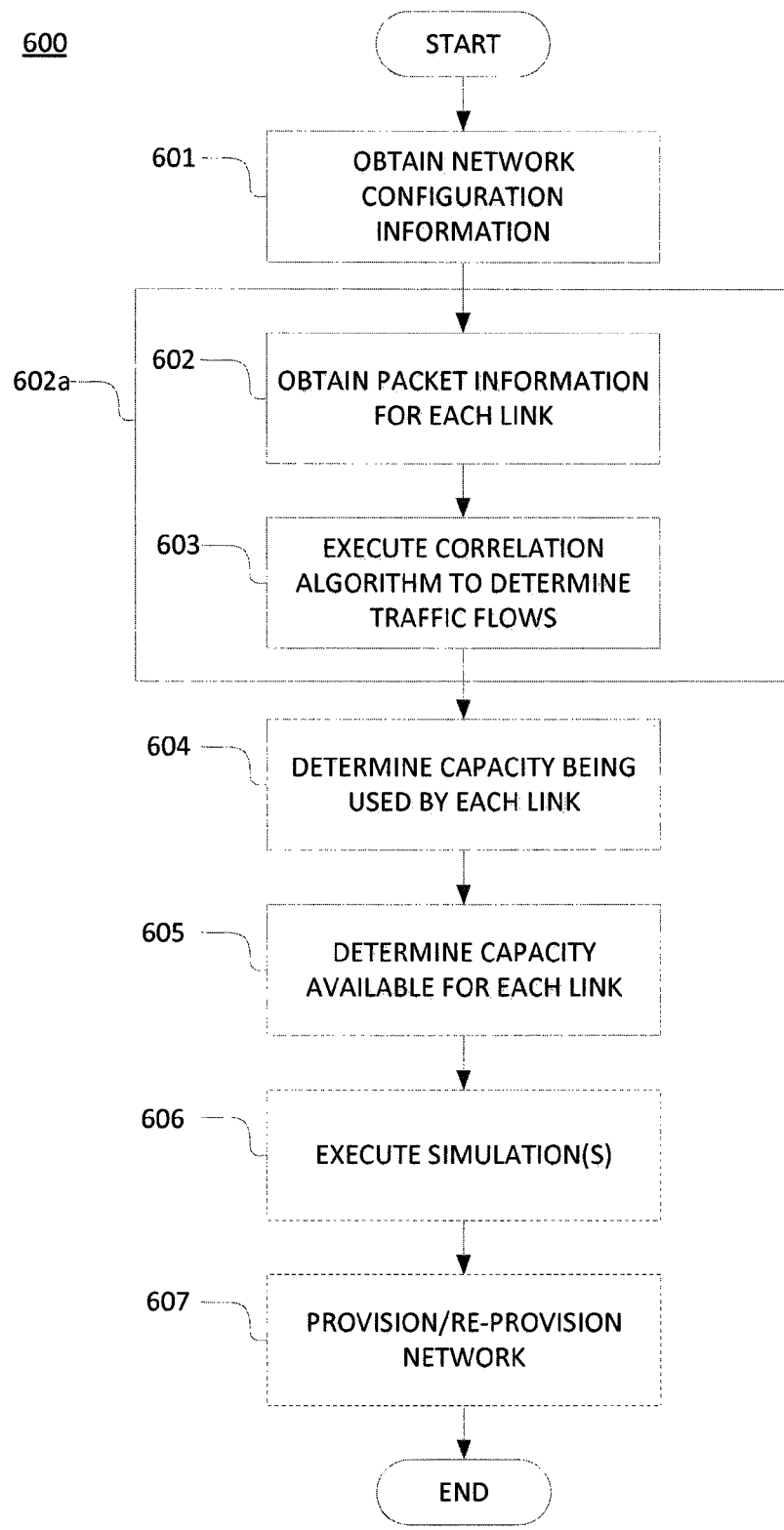
FIG. 6 is a flow diagram that illustrates an example procedure for planning and simulating an IP network, in accordance with an example embodiment described herein.

Reference will now be made to FIG. 6 to describe an example procedure 600 for evaluating a network, such as, in one example embodiment, an IP network, to enable planning and/or simulating of the network, in accordance with an example embodiment herein. In one example embodiment, each step of the procedure 600 can be implemented by one or more components of systems 100, 200, 300, and/or 400. In one non-limiting example, data processing system 400 can be included in analytics server 102 and can implement blocks 601 through 605 of the procedure 600; and an additional data processing system 400 can be included in a personal computer (e.g., user device 101) and can implement block 606 and/or block 607 of the procedure 600 to simulate and/or plan (i.e., provision or re-provision) an IP network. The following example implementation will be described in that context.

At block 601, the analytics server 102 obtains network configuration information regarding the network to be simulated (e.g., network 100, 200, or 500). In one example embodiment, the network configuration information obtained at block 601 includes network-related information, such as, by example only, information representing a topology of the network, equipment included at each node of the network, characteristics (e.g., a maximum capacity) for each link of the network, and/or demands (e.g., protection path demands) for certain types of traffic, etc. The network configuration information obtained by the analytics server 102 at block 601, as well as the various types of information that can be obtained by the analytics server 102 at each of blocks 602 and 603 (described below), may be obtained from various sources. For example, information can be obtained from one or more network elements 104, 105, 106, 501, other network elements, EMSs 201, and/or other servers or network components. In one example embodiment, the analytics server 102 provides the information obtained at block 601 to the user device 101 to be utilized in simulating and/or planning (i.e., provisioning or re-provisioning) the network.

At block 602a, which includes block 602 and block 603, packet information is obtained (i.e., aggregated) and a correlation algorithm is executed to determine traffic flows based on the aggregated packet information. In one example embodiment, at block 602, the analytics server 102 obtains (i.e., aggregates) packet information for each packet being communicated via the network to be simulated. The packet information also can be obtained from one or more sources, such as, for example, one or more EMSs (e.g., 201) and/or other network elements (e.g., 104, 105, and/or 106). In one example embodiment, the analytics server 102 requests and/or retrieves the packet information from a header of each packet being evaluated (i.e., in the flow(s) being evaluated) by way of one or more corresponding EMSs (e.g., 201) and/or other network elements (e.g., 104, 105, and/or 106), and, in one example, provides the information to the user device 101. The packet information generally includes, for each packet communicated via a particular link in the network, at least one of a packet identifier, link information, source node information, destination node information, and/or bandwidth information. The packet identifier identifies the applicable packet being communicated in the network. The link information can include a link identifier that identifies a link by which the packet is being communicated, an interface identifier that identifies an interface (e.g., an Ethernet interface, an asynchronous transfer mode (ATM) interface, an IP interface and/or the like) of a node (e.g., a first endpoint of the link or path or a second endpoint of the link or path, which may be a source node, a destination node, or an intermediary node) by which the packet is being communicated, and/or a port (e.g., an IP port) by which the packet is being communicated. The source node information can include, for example, at least one of an IP address of a source node 501 (or an IP address of an interface between a source node and a particular link) for a particular packet and/or a node identifier of the source node. The destination node information can include, for example, at least one of an IP address of a particular node 501 that is the destination of a particular packet and/or a node identifier of the destination node. The bandwidth information includes a bandwidth (e.g., in Mb/s) at which the packet is being communicated via a particular path/link.

In one example embodiment, a unique node identifier (e.g., node name) can be generated and/or configured for each node by a user via one or more EMSs (e.g., 201) and/or other network elements (e.g., 104, 105, and/or 106). A list of unique node identifiers is stored in a database (e.g., 305) in the analytics server 102. The analytics server 102 provides the node identifier(s) to the user device 101, e.g., in connection with other packet information and/or other network-related information, to be used as a unique identifier for referring to each node, for example, during planning and/or simulation of the network.

In another example embodiment, the packet information can include other types of network-related information (described above) and/or connection path information, such, as, for example, virtual local area network (VLAN) information, pseudowire information, MPLS information, a next link in a path, and/or a volume of bandwidth for a flow per link. Example packet information that may be obtained at block 602 for various packets of a network is shown in Table 1, where the nodes and/or links may be those shown in the Figures (see, e.g., nodes 801 through 806 and links 807 through 814) (although this example is not limiting). In some example embodiments, the packet information may include some, but not all, of the information shown in Table 1.

TABLE 1

| Packet ID (for link) | Link ID | Interface ID (endpoint 1) | Port ID (endpoint 1) | Interface ID (endpoint 2) | Port (endpoint 2) | Source Node ID | Destination Node ID | Bandwidth (Mb/s) |
|---|---|---|---|---|---|---|---|---|
| 1 | 807 | IP-1 | 012 | IP-2 | 113 | 801 | 802 | 50 |
| 1 | 808 | IP-1 | 564 | IP-3 | 275 | 802 | 803 | 100 |
| 2 | 808 | IP-2 | 544 | IP-4 | 569 | 802 | 804 | 10.5 |
| 1 | 809 | IP-3 | 417 | IP-3 | 254 | 802 | 804 | 9.5 |
| 1 | 813 | IP-2 | 772 | IP-3 | 995 | 804 | 805 | 25 |

Each row of Table 1 corresponds to a particular packet being communicated via the particular link identified in the first column (designated Link). For example, the first row of Table 1 corresponds to a first packet (having packet ID 1 for link 807) being communicated via the link 807 from node 801 to node 802, the second row of Table 1 corresponds to a first packet (having packet ID 1 for link 808) being communicated via the link 808 from node 802 to node 803, and the third row of Table 1 corresponds to a second packet (having packet ID 2 for link 808) being communicated via the link 808 from node 802 to node 804, and so on. The information in the second column of Table 1 (designated Link ID) identifies a particular link by which a particular packet is being communicated. The information in the first column of Table 1 (designated Packet ID (for link)) identifies a particular packet from among the one or more packets that are being communicated via the link indicated in the second column. The information in the third column (designated Interface ID (endpoint 1)) indicates an interface of a first endpoint of the link identified in the second column by which the particular packet is being communicated. The information in the fourth column (designated Port ID (endpoint 1)) indicates a port of a first endpoint of the link identified in the second column by which the particular packet is being communicated. The information in the fifth column (designated Interface ID (endpoint 2)) indicates an interface of a second endpoint of the link identified in the second column by which the particular packet is being communicated. The information in the sixth column (designated Port ID (endpoint 2)) indicates a port of a second endpoint of the link identified in the second column by which the particular packet is being communicated. The information in the seventh and eighth columns of Table 1 (designated Source Node and Destination Node, respectively) indicate a source node and destination node for the particular packet identified in the second column. The information in the ninth column of Table 1 (designated Bandwidth Mb/s) indicates a bandwidth at which the particular packet identified in the second column is being communicated via the link identified in the first column.

Referring again to FIG. 6, block 603 will now be described. At block 603, the analytics server 102 executes a correlation algorithm to determine traffic flow information (e.g., from source to destination of each packet) for the network (e.g., 100, 200, 500) (e.g., in its entirety or a part thereof) based on the packet information obtained at block 602. Example aspects of a correlation algorithm that may be executed at block 603 are described in further detail below in the context of FIG. 7. In general, the correlation algorithm includes tracing a traffic flow for each packet, based on the packet information obtained at block 602, from a source node of the packet to a destination node of the packet, and logging traffic flow information. In other words, at block 602, information is obtained regarding, for example, individual IP packets being communicated via individual links; and at block 603, information is determined (based on the information obtained at block 602) regarding flows being communicated from source nodes to destination nodes via paths, each of which may include one or more links. In this way, the analytics server 102 can determine connection-oriented packet flow information for each link (e.g., link(s) 502 in the case of FIG. 5) and can provide such flow information to the user device 101 to enable a user or operator to plan and/or simulate an IP network based on real traffic flows. The traffic flow information can include, for example, the bandwidth of the flow at each link and the overall path of the flow, including the source node, the destination node, and any intermediate nodes by which the packet is being communicated. In some example embodiments, the traffic flow may include other network-related information, such as, for example, link information (e.g., link identifier(s), interface identifier(s), port identifier(s)), source and/or destination node information (e.g., node identifiers, IP address(es)). In one example, the bandwidth information can include an average bandwidth amount(s) (e.g., in Mb/s) computed for each path based on the bandwidth amounts for each link of the path by which the packet is being communicated. Table 2 shows example results of executing the correlation algorithm of block 603 on the packets that are shown above in Table 1. In at least some example embodiments, the traffic flow information may include some, but not all, of the information shown in Table 2, or may include more than the type of information shown in Table 2.

TABLE 2

| Flow | Path (e.g.,. Node IDs, Node Interface IDs & Ports) | Bandwidth for flow (Mb/s) |
|---|---|---|
| 1 | 801 (IP-1, 012) to 802 (IP-2, 113) | 50 |
| 2 | 802 (IP-1, 564) to 803 (IP-3, 275) | 100 |
| 3 | 802 (IP-2, 544) to 803 (IP-4, 569) to 803 (IP-3, 417) to 804 (IP-3, 254) | 10 |
| 4 | 804 (IP-2, 772) to 805 (IP-3, 995) | 25 |

Each row of Table 2 corresponds to a particular flow (identified by the number in the first column designated Flow) being communicated via a particular path (identified in the second column designated Path). The information in the second column identifies a path that includes a source node, a destination node, and any intermediate nodes for the corresponding flow. For example, the first row of Table 2 corresponds to a flow being communicated via the path from node 801 to node 802, the second row of Table 2 corresponds to a flow being communicated via the path from node 802 to node 803, and the third row of Table 2 corresponds to a flow being communicated via the path from node 802 to node 804 by way of intermediate node 803, and so on. The information in the third column of Table 2 (designated Bandwidth Mb/s) indicates a bandwidth at which the particular flow identified in the first column is being communicated via the path identified in the second column.

In some cases traffic flows in an IP network can be bifurcated. That is, traffic can be communicated from a source node to a destination node via a plurality of different paths, which may or may not be link-diverse paths. In some example embodiments, the correlation algorithm executed by the analytics server 102 at block 603 includes tracing all paths of any bifurcated traffic flows.

Additionally, in some cases IP traffic flows can be asymmetrical. That is, a volume of a traffic communicated from a source node to a destination node may differ from a volume of a traffic communicated in the reverse direction (i.e., from the destination node to the source node). In some example embodiments, the correlation algorithm executed by the analytics server 102 at block 603 includes tracing traffic flows in all possible directions for the flow.

In one example embodiment, the various types of information obtained at blocks 601 (e.g., network configuration information), and/or 602 (e.g., packet information), and/or information resulting from executing the correlation algorithm at block 603 (e.g., traffic flows), and/or other network-related information is formatted (e.g., as a CSV file or any other suitable format) and stored in a database (e.g., 305) in the analytics server 102 to enable the information to be obtained and/or used by the user device 101, for example in simulating (e.g., 606) and/or planning (e.g., 607) a network.

Block 604 of FIG. 6 will now be described. At block 604, the analytics server 102 determines a capacity currently being used of each link 502 based on the packet information obtained at block 602. In one example embodiment, the analytics server 102 determines a capacity currently being used by each link by computing a sum of the packet information (e.g., an amount of bandwidth for each packet) obtained at block 602 for each link 402. For example, using the example provided above in the context of Table 1, link 808 includes a first packet of traffic being communicated at a bandwidth of 100 Mb/s from node 802 to node 803 and another packet of traffic being communicated at a bandwidth of 10.5 Mb/s from node 802 to node 804. In this case, the capacity currently being used by link 808 equals 110.5 Mb/s, which is the sum of the bandwidth of the first packet (100 Mb/s) and the bandwidth of the other packet (10.5 Mb/s).

At block 605, the analytics server 102 determines a capacity currently available (i.e., not currently being used) for each link 502 by computing, for each link 502, a difference between the maximum capacity for the link 502 obtained at block 601 and the capacity determined at block 604 as currently being used for the link 502. In other words, at block 605, the available capacity for each link is determined by subtracting the capacity currently being used for the link from the maximum capacity for the link. In some example embodiments, the capacity determined at block 605 to be available for each link 502 is deemed to be a protection capacity that is available (i.e., a capacity available to be used for a protection path).

In some example embodiments, the procedure 600 can further include one or more of the functions associated with optional blocks 606 and/or 607, and the user device 101 performs those blocks based on information obtained from server 102 during the procedure 600. At optional block 606, the user device 101 executes one or more simulations of various aspects of the network based on the packet information obtained at block 602 and/or the traffic flows determined at block 603, for the network being simulated. Thus, by executing simulations based on actual IP packet data obtained from the network being simulated, the value of the simulation can be improved in comparison to other types of simulations (e.g., simulations based on assumed or theoretical traffic data). Example types of simulations that the user device 101 may execute at block 606 include without limitation simulations that can determine (1) whether there is enough capacity in the network for the current flows, (2) where in the network congestion is likely to occur if all customers use peak demand, (3) whether there is enough capacity in the network for traffic to re-route if a link fails, (4) whether there is enough capacity in the network for traffic to re-route if a router fails, (5) whether there is enough capacity in the network if multiple traffic flows reach higher burst rates at the same time, (6) whether there is enough capacity in the network for time-based variations of traffic flows, (7) whether there is enough capacity in the network for combinations of the above capacity variations, (8) whether there is enough bandwidth in the network to support specific links failing, (9) whether there is enough "best effort" traffic (i.e., low-priority traffic) to make the network configuration acceptable, (10) whether performance of the network can improve if some OSPF costs are changed, and how such costs should be changed, (11) whether there is enough unused capacity in the network for a prospective customer's requirements or more equipment is required, etc. These procedures can be performed using any suitable known or later developed simulation techniques.

In one example embodiment, at block 606 the user device 101 executes a simulation of various aspects of the network to determine whether various demands that may have been obtained at block 601 (e.g., traffic demand information, a protection level required for each traffic flow, etc.) are satisfied. For example, the user device 101 can compare results of such a simulation (e.g., results indicating an amount of bandwidth available for each node and/or link assuming a predetermined traffic flow scenario) against specific individual demands for protection level(s) for each traffic flow to determine whether demands are satisfied. The user device 101 may provide to a user or operator the result of such a comparison, e.g., an indication of whether enough bandwidth is available on alternate routes to provide protection for each corresponding flow.

At optional block 607, a user can control the user device 101 to re-provision traffic in the network, for example, to resolve an issue revealed by one or more simulations executed at block 606, or in other embodiments, this can be determined automatically. In one example embodiment, the user device 101 is used to rebalance traffic to relieve congestion by rerouting traffic currently being communicated via high usage links to instead be communicated via links with lower usage.

According to one example embodiment, traffic can be re-balanced (or re-provisioned) by changing an open shortest path first (OSPF) cost value for a particular link, and/or or by redirecting connection-oriented traffic (including but not limited to pseudowires, VLAN, and/or MPLS routes) to other links, based on the packet information obtained at block 602 and/or the traffic flows determined at block 603. For example, a relatively high quality of service (QoS) may be demanded for connection-oriented traffic, which may be particularly sensitive to network disruptions and/or changes. A relatively low QoS may be demanded for best-effort Internet traffic. Best-effort Internet traffic can be automatically added for a link, or automatically limited for a link, by decreasing a OSPF cost value or by increasing a OSPF cost value, respectively.

Having described a procedure 600 for evaluating a network, reference will now be made to FIG. 7 to describe an example procedure 700 for determining traffic flow information based on flows per link (e.g., current link usage data). In one example embodiment, the procedure 700 further represents the functions associated with block 603 of procedure 600. In one example embodiment, each step of the procedure 700 can be implemented by one or more components of systems 100, 200, 300, and/or 400. For example, data processing system 400 can be included in a server (e.g., analytics server 102) and can implement the procedure 700 to determine and aggregate traffic flow information for a network based on flows per link. The analytics server 102 can then provide the aggregated traffic flows to user device 101 to enable it to plan and/or simulate an IP network.

In general, according to example embodiments herein, traffic flows can be determined in procedure 700 based on usage data (flows per link) by generating a map of the network based on information representing a topology of links and network elements, EMSs, etc. (e.g., as obtained at block 601); determining a source node, a destination node, and volume of traffic for all individual flows for each link; and tracing traffic flows from source node to destination node along all possible paths, optionally matching traffic volumes for each flow from link to link as a safeguard.

Figure 7:
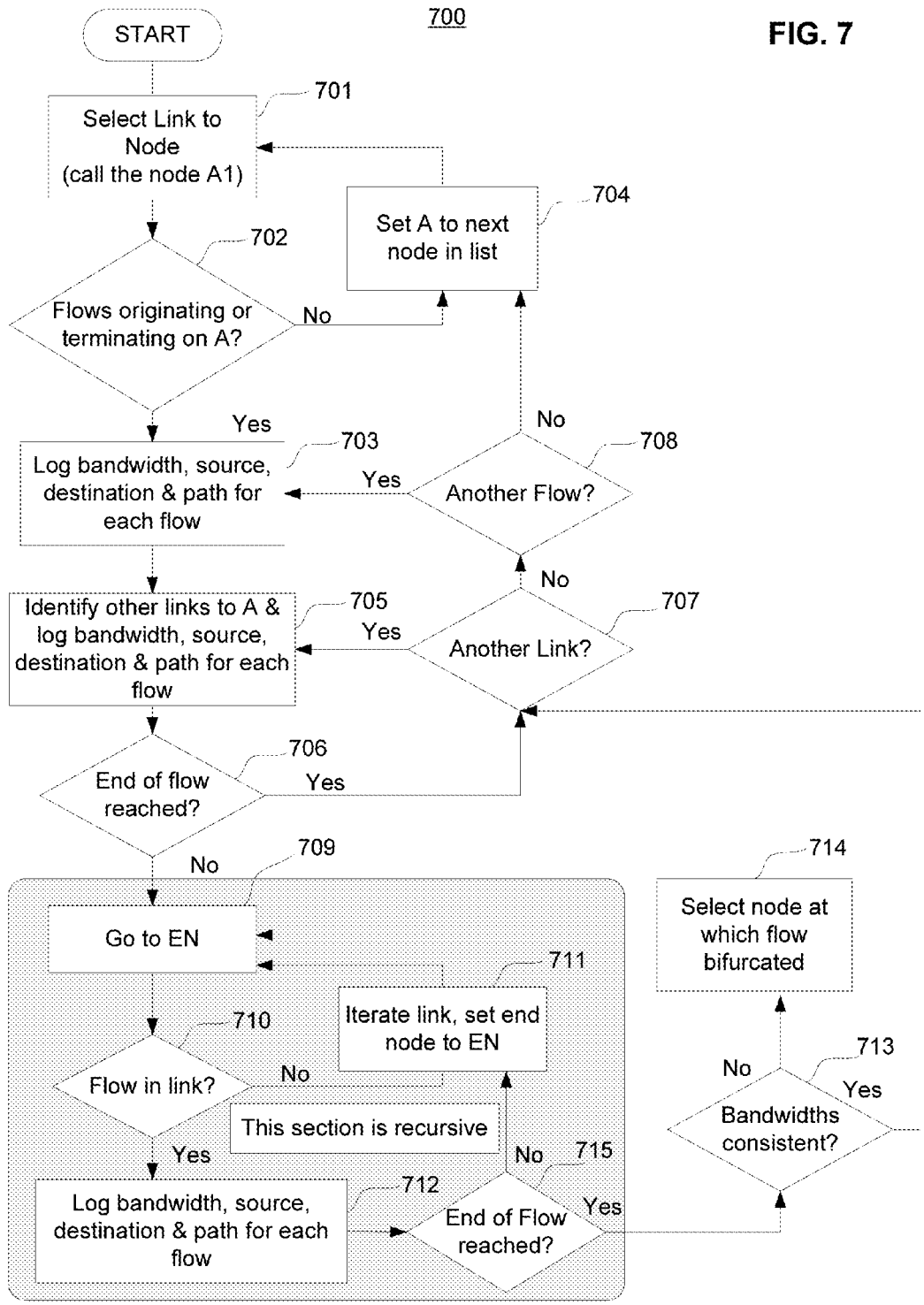
FIG. 7 is a flow diagram that illustrates an example procedure for determining traffic routes, in accordance with an example embodiment described herein.

More specifically, referring to FIG. 7, at block 701, the analytics server 102 selects, from a list of nodes and links of a network, a node, as well as a link having the selected node as an endpoint.

At block 702, the analytics server 102 determines, based on network-related information obtained from one or more sources in the network (e.g., see above description of blocks 601, 602, and/or 603), whether any flows (communicated via the link selected at block 701) begin or end at (i.e., have a source node or a destination node corresponding to) the node last selected at block 701.

In one example embodiment, at block 702 the analytics server 102 determines whether any flows (communicated via the link selected at block 701) begin or end at the node last selected at block 701, based on packet information (e.g., a header) of one or more packets currently being communicated via that link. In one example, the analytics server 102 obtains the packet information (e.g., as described above in connection with block 602) from one or more sources, such as, for example, one or more EMSs (e.g., 201) and/or other network elements (e.g., 104, 105, and/or 106) (e.g., as described above in connection with block 602) for one or more packets currently being communicated via the applicable link. The packet information, in one example, includes a header of the packet that includes an identifier (e.g., IP address) of a source node of the packet and an identifier of a destination node of the packet. The analytics server 102 compares the identifiers of the source node and of the destination node obtained from the packet header to an identifier of the node last selected at block 701. If either the identifier of the source node or the identifier of the destination node matches the identifier of the node last selected at block 701, then that indicates that a flow that is communicated via the link selected at block 701 does begin or end at the node last selected at block 701. If, on the other hand, neither the identifier of the source node nor the identifier of the destination node matches the identifier of the node last selected at block 701, then that indicates that no flow that is communicated via the link selected at block 701 begins or ends at the node last selected at block 701.

Figure 8:
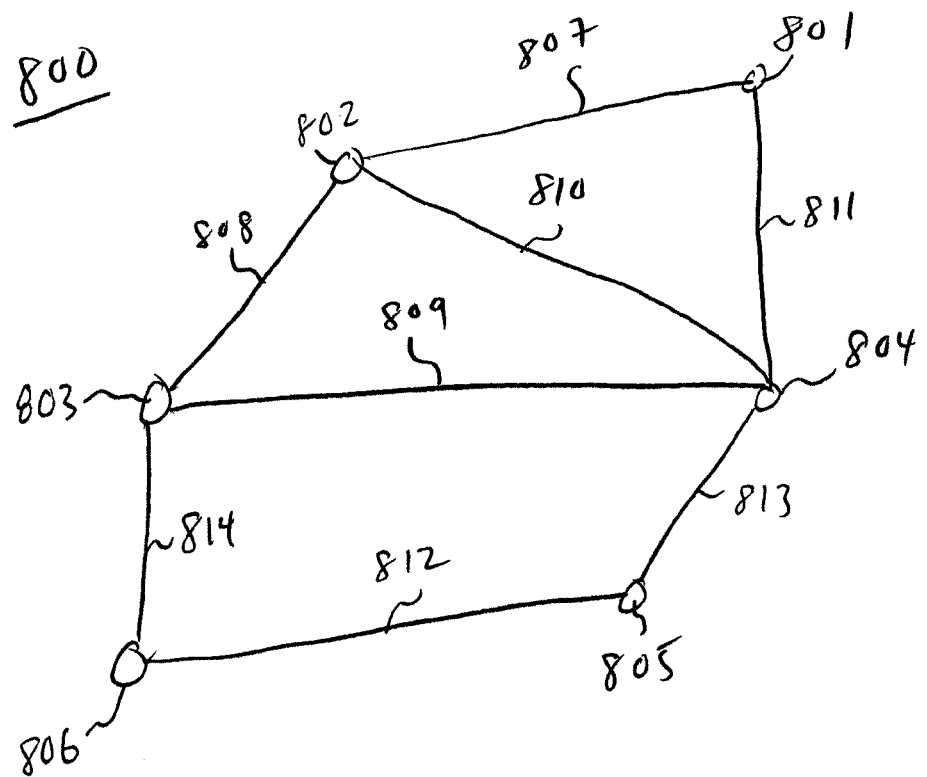
FIG. 8 is a representation of an example communication network that is constructed and operated in accordance with at least one example embodiment described herein.

For example, and with reference to FIG. 8, if link 807 and node 801 were selected at block 701, then the analytics server 102 determines at block 702 whether there are any flows through link 807 that begin or end at node 801. The analytics server 102, in this example, obtains a packet header from one or more sources (e.g., node 801, node 802) for one or more packets currently being communicated via link 807. The analytics server 102 then obtains, from a header of the packet, an identifier (e.g., IP address) of a source node of the packet and an identifier of a destination node of the packet. The analytics server 102 compares the identifiers of the source node and of the destination node to an identifier of node 801. If either the identifier of the source node or the identifier of the destination node match the identifier of node 801, then that indicates that a flow that is communicated via link 807 does begin or end at node 801. If, on the other hand, neither the identifier of the source node nor the identifier of the destination node match the identifier of node 801, then that indicates that no flow that is communicated via link 807 begins or ends at node 801.

If the analytics server 102 determines at block 702 that there are no flows (through the link selected at block 701) that begin or end at the node last selected at block 701 ("No" at block 702), then control passes to block 704 where the analytics server 102 identifies another node from a list of nodes of the network. Then control passes to block 701 to select the node identified at block 704 as well as a link having that node as an endpoint.

If, on the other hand, the analytics server 102 determines at block 702 that there is at least one flow through the link last selected at block 701 that begins or ends at the node last selected at block 701 ("Yes" at block 702), then, at block 703, the analytics server 102 selects the flow determined at block 702, and logs information representing a bandwidth, a source node, a destination node, and a path (including one or more links) obtained from one or more sources in the network (e.g., see above description of blocks 601, 602, 603, and/or Tables 1, 2) for each such flow. In one example embodiment herein, information representing the bandwidth, source node, destination node, and path is obtained, as described above at block 702, by the analytics server 102 from one or more headers the of one or more packets being communicated in the network for each such flow.

At block 705, the analytics server 102 identifies (i.e., selects) any other link that has an endpoint at the node that was selected at block 701, if any such other link exists; identifies each flow for each such other link; and obtains (e.g., from a header of one or more packet(s) of the applicable flow) and logs information representing a bandwidth, a source node, a destination node, and a path (including one or more links) obtained (from the header) for each such flow from one or more sources in the network (e.g., see above description of blocks 601, 602, and/or 603) in a similar manner as described above in connection with block 703, but for the link(s) identified in block 705. In one example embodiment, the analytics server 102 identifies (i.e., selects)

any other link that has an endpoint at the node that was selected at block 701 based on topology information. For example, in one example embodiment, the analytics server 102 obtains topology information (i.e., information representing a topology of nodes and links of the network) from one or more sources in the network (e.g., as described above in connection with block 601), and stores the topology information in a database (e.g., 305). That information is used at block 705, where the analytics server 102 identifies any other link that has an endpoint at the node that was selected at block 701 by querying the database to identify whether the topology information for the applicable node identifies the presence of any such link(s).

At block 706, the analytics server 102 determines whether an end of the flow (i.e., a destination node for the flow) selected at block 703 has been reached. In one example embodiment, the analytics server 102 determines whether an end of the flow has been reached by comparing an endpoint (other than the node selected at block 701) of the link(s) selected at node 705 to the destination node previously logged at block 705 for the flow. For example, the analytics server 102 can determine whether an end of the flow has been reached by comparing an IP address (e.g., obtained from a header of a packet of the applicable flow) of an endpoint of the link selected at node 705 to an IP address of the destination node previously obtained (e.g., from a header of a packet of the applicable flow) and logged at block 705. For example, and with reference to FIG. 8, assuming node 801 was selected at block 701, and link 811 was selected at block 705, then at block 706 the analytics server 102 compares the IP address of node 804 (which is an endpoint of the link 811 other than node 801) to the IP address of the destination node previously logged at block 705 for a particular flow on link 811.

If an endpoint (other than the node selected at block 701) of the link selected at node 705 is the same node as the destination node previously logged for the flow at block 705, then the end of the flow is deemed to have been reached. If, on the other hand, an endpoint (other than the node selected at block 701) of the link selected at node 705 is not the same node as the destination node previously logged for the flow at block 705, then the end of the flow is deemed not to have been reached.

If the analytics server 102 determines at block 706 that the end of the flow selected at block 703 has been reached ("Yes" at block 706), then control passes to block 707. At block 707, the analytics server 102 determines, based on network-related information obtained from one or more sources in the network (e.g., see above description of blocks 601, 602, and/or 603), whether any other link to the node that was selected at block 701 exists.

As described above, in one example embodiment, the analytics server 102 obtains topology information (i.e., information representing a topology of nodes and links of the network) from one or more sources in the network (e.g., as described above in connection with block 601), and stores the topology information in a database (e.g., 305). That information is used at block 707, where the analytics server 102 determines whether any other link to the node that was selected at block 701 exists by querying the database to identify whether the topology information for the applicable node identifies the presence of any such link(s).

If the analytics server 102 determines at block 707 that another link to the node selected at block 701 exists ("Yes" at block 707), then control passes to block 705 where the analytics server 102 selects that other link and where the procedure continues in the manner described above for block 705. If, on the other hand, the analytics server 102 determines at block 707 that no other link to the node that was selected at block 701 exists ("No" at block 707), then control passes to block 708.

At block 708, the analytics server 102 determines, based on network-related information obtained from one or more sources in the network (e.g., see above description of blocks 601, 602, and/or 603), whether any other flow exists for the last link selected at block 705 (i.e., whether an additional flow is provided via the link) and based on the node last selected at block 701. In one example embodiment, the analytics server 102 determines at block 708 whether any other flows exist for the link last selected at block 705, by performing functions similar to those described above in the context of block 702.

If the analytics server 102 determines at block 708 that another flow exists for the link selected at block 705 ("Yes" at block 708), then control passes to block 703, which is performed as described above for that flow. If, on the other hand, the analytics server 102 determines at block 708 that no other flow exists for the link selected at block 705 ("No" at block 708), then control passes to block 704 which is performed as described above.

Referring now back to block 706, if the analytics server 102 determines at block 706 that the end of the flow selected at block 703 has not yet been reached ("No" at block 706), then control passes to block 709. At block 709, the analytics server 102 selects, from a list of nodes of the network, a node (other than the node last selected at block 701) that is an endpoint of the link selected at block 705. For example, and with reference to FIG. 8, if node 801 was previously selected at block 701 and link 811 was previously selected at block 705, then at block 709, the analytics server 102 selects node 804, which is an endpoint of link 811 other than node 801.

At block 710, the analytics server 102 determines, based on network-related information (e.g., packet header information) obtained from one or more sources in the network (e.g., see above description of blocks 601, 602, and/or 603), whether any flow from the link last selected at block 701 is carried in a link (other than the link(s) previously selected during previous iterations of block 705) that has an endpoint at the node selected at block 709. For example, and with reference to FIG. 8, if link 807 was previously selected at block 701 and link 810 was previously selected at block 705, and node 804 was previously selected at block 709, then at block 710 the analytics server 102 determines whether any flow from link 807 is carried in link 809 or 813 (which are links other than link 807 and link 810 that have an endpoint at node 804).

If the analytics server 102 determines at block 710 that no flow from the link selected at block 701 is carried in a link (other than the link(s) previously selected during previous iterations of block 705) that has an endpoint at the node selected at block 709 ("No" at block 710), then control passes to block 711. At block 711, the analytics server 102 selects another link to the node selected at block 709. Control then passes to block 709 which is performed as described above.

If the analytics server 102 determines at block 710 that at least one flow from the link selected at block 701 is carried in another link (other than the link(s) previously selected during previous iterations of block 705) that has an endpoint at the node selected at block 709 ("Yes" at block 710), then the at least one flow is selected at block 710 and control passes to block 712. At block 712, the analytics server 102 logs information representing a bandwidth, a source node, a destination node, and a path (including one or more links)

obtained from one or more sources in the network (e.g., see above description of blocks 601, 602, 603, and/or Tables 1, 2) for each such flow on the link having an endpoint at the node selected at block 709. In one example embodiment, the information representing the bandwidth, the source node, the destination node, and the path is obtained from a packet header of one or more packets of such flow(s) being communicated in the network. (Thus, as a result of the performance of block 712 and each subsequent performance thereof, there is logged, for each flow on the link (other than the link(s) previously selected during previous iterations of block 705) having an endpoint at the node(s) selected at block 709, a bandwidth, a source node, a destination node, and a path (including one or more links).) After block 712, control then passes to block 715.

At block 715, the analytics server 102 determines whether an end of the flow (i.e., a destination node for the flow) that was last selected at block 710 has been reached. In one example embodiment, the procedure for determining, at block 715, whether an end of a flow has been reached is similar to the procedure described above in connection with block 706 for determining whether an end of a flow has been reached, but is performed with respect to the node last selected at block 709, the flow last selected at block 701, and the link last determined at block 710 as carrying that flow. If the analytics server 102 determines at block 715 that an end of the flow last selected at block 710 has not been reached ("No" at block 715), then control then passes to block 711, which is performed as described above with respect to that flow. If, on the other hand, the analytics server 102 determines at block 715 that an end of the flow last selected at block 710 has been reached ("Yes" at block 715), then control then passes to block 713.

At block 713, the analytics server 102 determines whether the bandwidths logged during previous iterations of block 712 are substantially consistent (e.g., within a predetermined range of each other) (although not necessarily exactly equal because IP traffic flows may vary over time) from link to link, to determine whether the flow selected at block 710 is bifurcated and/or to identify any erroneous bandwidth amounts and/or other data were logged.

In other words, if the bandwidth logged during previous iteration(s) of block 712 is substantially consistent from link to link, then it is deemed that the flow did not split to be communicated via more than one path and/or that no erroneous bandwidth amounts were logged. If, on the other hand, the bandwidth logged during previous iteration(s) of block 712 is not substantially consistent from link to link, then it is deemed that the flow did split to be communicated via more than one path (or that there was an erroneous bandwidth amount logged), with a portion of the flow (and a portion of the total bandwidth for the flow) being communicated via a first path, and one or more other portions of the flow (and one or more other portions of the total bandwidth for the flow) being communicated via one or more additional paths.

If the analytics server 102 determines at block 713 that the logged bandwidths are substantially consistent from link to link ("Yes" at block 713), then the flow is deemed not to have been bifurcated and control passes to block 707, which is performed as described above for the node last selected at block 701. If, on the other hand, the analytics server 102 determines at block 713 that the logged bandwidths are not substantially consistent from link to link ("No" at block 713), then the applicable flow is deemed to have been bifurcated and control passes to block 714. At block 714, the analytics server 102 selects the node at which the bifurcation is deemed to have occurred. In one example embodiment, the analytics server 102 selects the node at which the bifurcation is deemed to have occurred by tracing packets of the applicable flow, beginning at its source node (e.g., as identified by a source node identifier in a header of one or more of the packets), analyzing bandwidths that were logged for the packets at respective link(s) of the applicable flow during previous performances of block 712, and identifying the first node (and/or link) for which a bandwidth of one of the packets logged at block 712 is substantially inconsistent with a bandwidth of a corresponding other one of the packets that was logged at an immediately previous performance of block 712 (i.e., at a previous link and/or node). After block 714, control then passes to block 709, which is performed as described above with respect to that node.

In some example embodiments, as shown in the flowchart of FIG. 7, the procedure 700 is a recurring loop (i.e., a procedure with no defined end) by which the analytics server 102 can continuously analyze and determine traffic flows for the nodes and links of a network. In this way, the analytics server 102 can provide up-to-date traffic flow information to user device 101 to enable it to plan and/or simulate the network based on actual, historical traffic flows obtained from the underlying network being planned and/or simulated.

Having described an example procedure 700 for determining traffic routes based on flows per link, reference will now be made to FIG. 8 to describe example results of procedure 700. FIG. 8 shows an example network 800 that includes nodes 801 through 806 and links 807 through 814. As described above, in some cases traffic may be bifurcated and/or asymmetrical. Nonetheless, for the sake of convenience, this example is described in the context of a representative set of nodes, links, and traffic demands, and it is assumed for the sake of simplicity that traffic is bi-directional.

In this example, there are three flows on link 807. The first flow for link 807 includes traffic from node 801 to node 802. The bandwidth of this flow in link 807 is 498 Mb/s. Since, by virtue of the procedure 700, this flow has been traced to its destination (i.e., node 802), the tracing of this flow is complete.

The second flow for link 807 includes traffic from node 801 to node 803. The bandwidth of this flow in link 807 is 143 Mb/s. Other links from node 802 include link 808 and link 810. The bandwidth of the flow in link 808 is 142 Mb/s, which substantially matches the bandwidth for the flow in link 807. Link 810 does not include any traffic for this flow from node 801 to node 803. Since this flow has been traced to its destination (i.e., node 803), the tracing of this flow is complete.

The third flow for link 807 includes traffic from node 801 to node 806. The bandwidth of this flow in link 807 is 90 Mb/s. Other links from node 802 include link 808 and link 810. The bandwidth of this flow in link 808 is 92 Mb/s, which substantially matches the bandwidth for this flow in link 807. Link 810 does not carry any traffic for this flow from node 801 to node 806.

Links to node 804 include link 809, link 811, and link 813. Neither link 809 nor link 811 carry any traffic for this flow from node 801 to node 806. Link 813 carries 89 Mb/s of traffic for this flow from node 801 to node 806, which substantially matches the bandwidth of this flow carried via link 810. Links to node 805 include link 812. The bandwidth of this flow in link 812 is 91 Mb/s, which substantially matches the bandwidth of this flow in link 810 and the bandwidth of this flow in link 813. Because this flow has been traced to its destination (i.e., node 806), the tracing of this branch is complete.

On link 808, there is one flow that includes traffic from node 802 to node 803. The bandwidth of this flow in link 808 is 352 Mb/s. Since this flow has been traced to its destination (i.e., node 803), the tracing of this flow is complete. There are no other flows that start at either link 802 or link 803.

On link 809, there are three flows. The first flow for link 809 includes traffic from node 803 to node 804. The bandwidth of this flow in link 809 is 83 Mb/s. Since this flow has been traced to its destination (i.e., node 804), the tracing of this flow is complete.

The second flow for link 809 includes traffic from node 804 to node 806. The bandwidth of this flow in link 809 is 132 Mb/s. Other links from node 803 include link 814 and link 808. The bandwidth of this flow in link 814 is 134 Mb/s, which substantially matches the bandwidth of this flow in link 809. Link 808 does not carry any traffic for this flow from node 804 to node 806. Because this flow has been traced to its destination (i.e., node 806), the tracing of this flow is complete.

The third flow for link 809 includes traffic from node 801 to node 806. The bandwidth of this flow in link 809 is 90 Mb/s, which substantially matches the bandwidth of this flow in link 808. Because this flow has been traced to its destination (i.e., node 806), the tracing of this flow is complete.

On link 813 there are three flows. The first flow for link 813 includes traffic from node 804 to node 805. The bandwidth of this flow in link 813 is 220 Mb/s. Since this flow has been traced to its destination (i.e., node 805), the tracing of this flow is complete.

The second flow for link 813 includes traffic from node 801 to node 806. This flow, which has been described above (in the context of the third flow for link 807) does not begin at either node 804 or 805.

The third flow for link 813 includes traffic from node 804 to node 806. The bandwidth of this flow in link 813 is 89 Mb/s. Other links from node 805 include link 812. The bandwidth of this flow in link 812 is 90 Mb/s, which is consistent with the bandwidth of this flow in link 813. Because this flow has been traced to its destination (i.e., node 806), the tracing of this flow is complete.

On link 812 there is one flow including traffic from node 805 to node 806. The bandwidth of this flow in link 812 is 156 Mb/s. Because this flow has been traced to its destination (node 806), the tracing of this flow is complete. No other flow exists that begins at either endpoints of link 812 (i.e., at either node 805 or node 806).

On link 814, there are two traffic flows. The first traffic flow for link 814 includes traffic from link 803 to link 806. The bandwidth of this flow in link 814 is 192 Mb/s.

The second traffic flow for link 814 includes traffic from node 804 to node 806 and has already been described above.

On link 811, there is one traffic flow carrying traffic from node 801 to node 804. The bandwidth of this flow in link 811 is 457 Mb/s. Since this flow has been traced to its destination (i.e., node 804), the tracing of this flow is complete.

On link 810, there is one traffic flow carrying traffic from node 801 to node 804. The bandwidth of this flow in link 810 is 120 Mb/s. Since this flow has been traced to its destination (i.e., node 804), the tracing of this flow is complete.

There are no other flows that begin at either link endpoints of link 814 (i.e., at either node 803 or node 806), at either link endpoints of link 811 (i.e., at either node 801 or node 804), or at either link endpoints of link 810 (i.e., at either node 802 or node 804).

The results of tracing the example network 800 described above are shown in Table 3.

TABLE 3

| Link endpoints | | Flows (1) | | Flows (2) | | Flows (3) | | |
|---|---|---|---|---|---|---|---|---|
| A_Loc | Z_Loc | endpoints | Mb/s | endpoints | Mb/s | endpoints | Mb/s | Aggregate |
| 801 | 802 | 801-802 | 498 | 801-803 | 143 | 801-806 | 90 | 731 |
| 802 | 803 | 802-803 | 352 | 801-803 | 142 | 801-806 | 92 | 586 |
| 803 | 804 | 803-804 | 83 | 804-806 | 132 | | | 215 |
| 804 | 805 | 804-805 | 220 | 801-806 | 89 | 804-806 | 89 | 398 |
| 805 | 806 | 805-806 | 156 | 801-806 | 91 | 804-806 | 90 | 337 |
| 803 | 806 | 803-806 | 192 | 804-806 | 134 | | | 326 |
| 801 | 804 | 801-804 | 457 | | | | | 457 |
| 802 | 804 | 802-804 | 120 | | | | | 120 |

The first two columns of Table 1 (i.e., A_Loc and Z_Loc, respectively) indicate link endpoints where a particular measurement is made. The third and fourth columns of Table 1 (i.e., endpoints and Mb/s, respectively) indicate flow information for a flow designated Flow 1, with ingress and egress nodes indicated in the third column and a corresponding bandwidth amount indicated in the fourth column. Similarly, the fifth and sixth columns of Table 1 (i.e., endpoints and Mb/s, respectively) indicate flow information for a flow designated Flow 2, and the seventh and eighth columns of Table 1 (i.e., endpoints and Mb/s, respectively) indicate flow information for a flow designated Flow 3. For each link defined by the first and second columns of Table 1, the ninth column of Table 1 indicates an aggregate amount of bandwidth being utilized.

Having described an example procedure 700 for determining traffic routes based on flows per link (current usage data), as well as an example implementation of procedure 700, reference will now be made to FIGS. 9 through 12 to describe an example procedure for rebalancing traffic. In one example embodiment, the example procedure described herein in connection with FIGS. 9 through 12 further represents one or more functions associated with block 607 of procedure 600.

Figure 9:
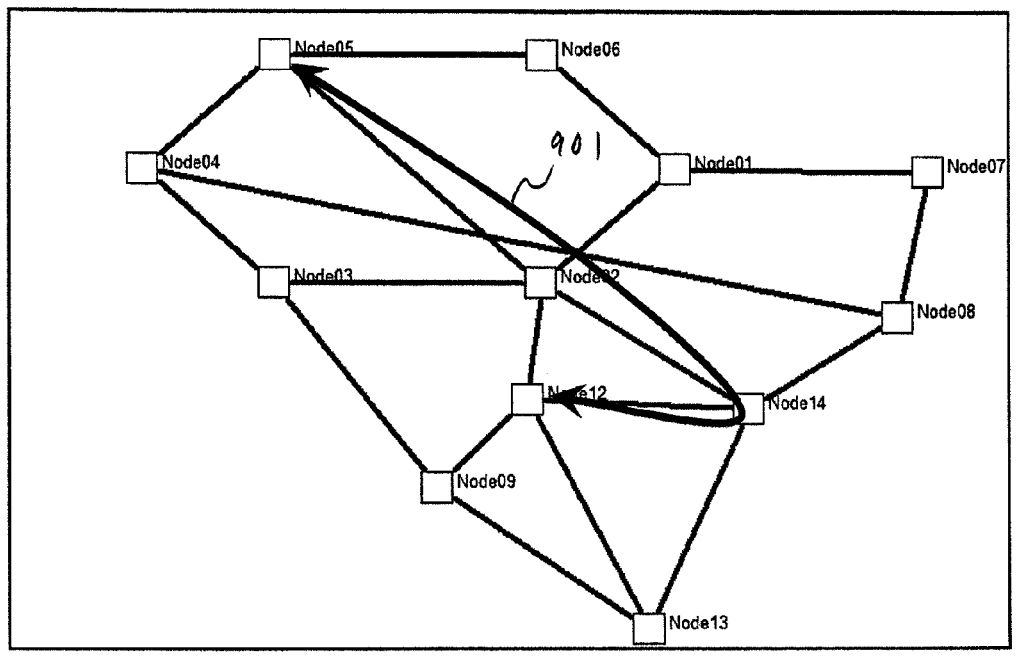
FIG. 9 is yet another representation of an example communication network that is constructed and operated in accordance with at least one example embodiment described herein.
Figure 10:
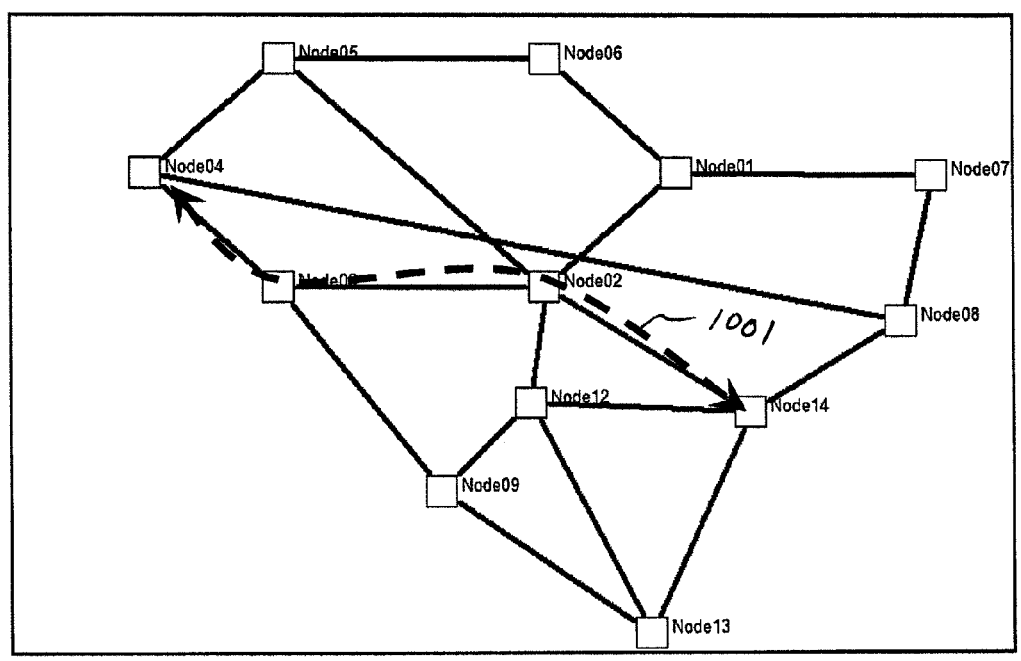
FIG. 10 is a further representation of an example communication network that is constructed and operated in accordance with at least one example embodiment described herein.
Figure 11:
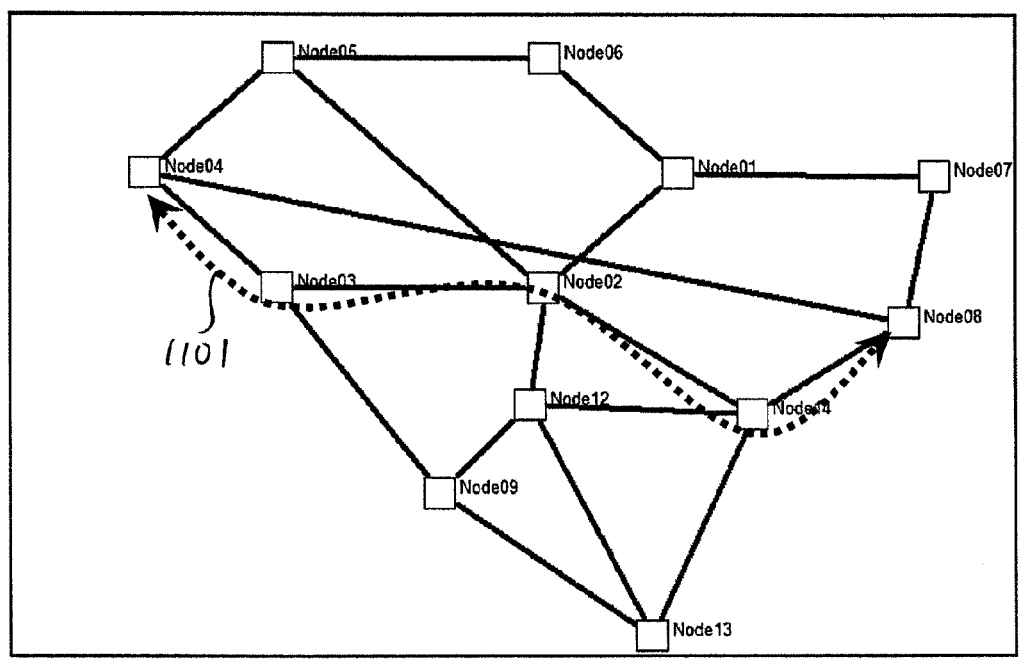
FIG. 11 is another representation of an example communication network that is constructed and operated in accordance with at least one example embodiment described herein.
Figure 12:
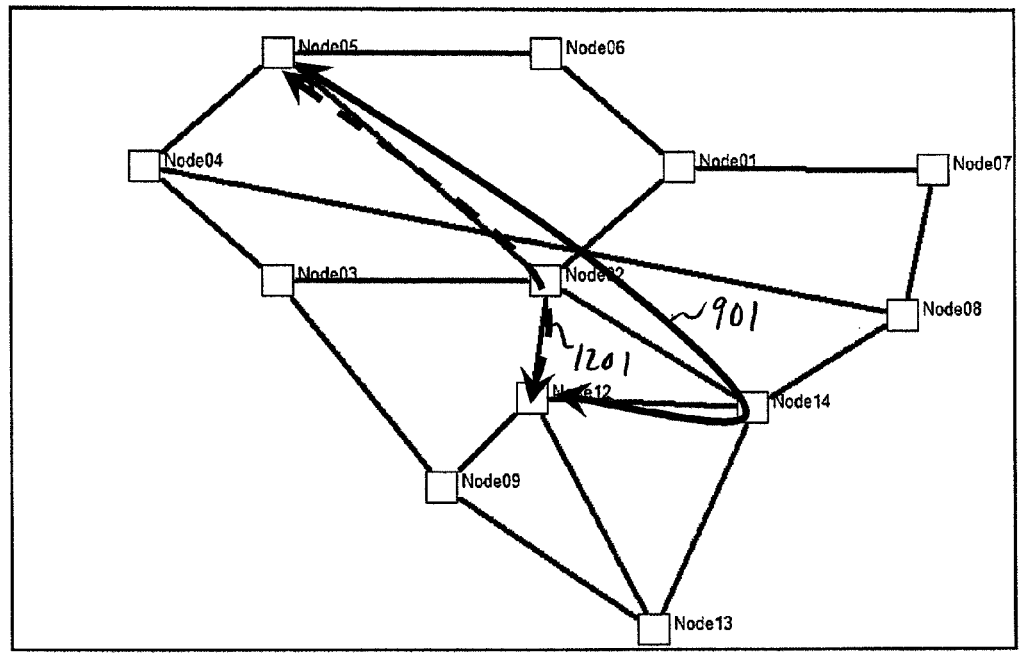
FIG. 12 is still another representation of an example communication network that is constructed and operated in accordance with at least one example embodiment described herein.

FIG. 9 is a partial representation of an IP network 900, which in some example embodiments may further represent IP networks 103, 500, and/or 800 described above in the context of FIGS. 1, 5, and 8, respectively. By utilizing correlation mechanism techniques, the analytics server 102 can examine traffic of the network 900 so that its constituent parts can be identified with respect to source and destination. For example, by utilizing a correlation algorithm such as the correlation algorithm described above in the context of block 603 and/or procedure 700, the analytics server 102 can determine that three traffic flows exist on the port on Node02 that is connected to Node14: a first traffic flow from Node12 to Node5 (i.e., flow 901 shown in FIG. 9), a second traffic flow from Node14 to Node04 (i.e., flow 1001 shown in FIG. 10), and a third traffic flow from Node08 to Node04 (i.e., flow 1101 shown in FIG. 11).

In a similar manner, traffic is then identified on each other port on each node of the network 900, and the traffic routes and corresponding bandwidths for each flow are determined using the procedure above.

The analytics server 102 measures the total traffic utilization for each router port. For example, the analytics server 102 may determine that the port on Node02 connecting Node14 has a traffic utilization of 80%. If this is a 10 Gb/s link, then there would be 80%×10 Gb/s=8 Gb/s of packet traffic flowing through this port. In one example, a network operator may deem a traffic load of 80% to be too high to handle potential peak traffic loads. In this case, the network operator can redirect one of the flows, e.g., the flow between Node12 and Node05 (flow 901 shown in FIGS. 9 and 12), to an alternate path (e.g., flow 1201 shown in FIG. 12) that does not use the link from Node02 to Node14.

However, in some cases such a rerouting of traffic may cause congestion in other parts of the network. In such cases, the analytics server 102 can provide a holistic view of the network in its entirety (e.g., to user device 101), with all flows and constituent bandwidths represented, to enable a user or operator to simulate, provision and/or re-provision the network to ensure that any rerouting does not cause unacceptable congestion in another portion of the network 900. For example, the user device 101 can be used by a service provider to rearrange traffic flows with improved confidence that congestion can be minimized.

Figure 13:
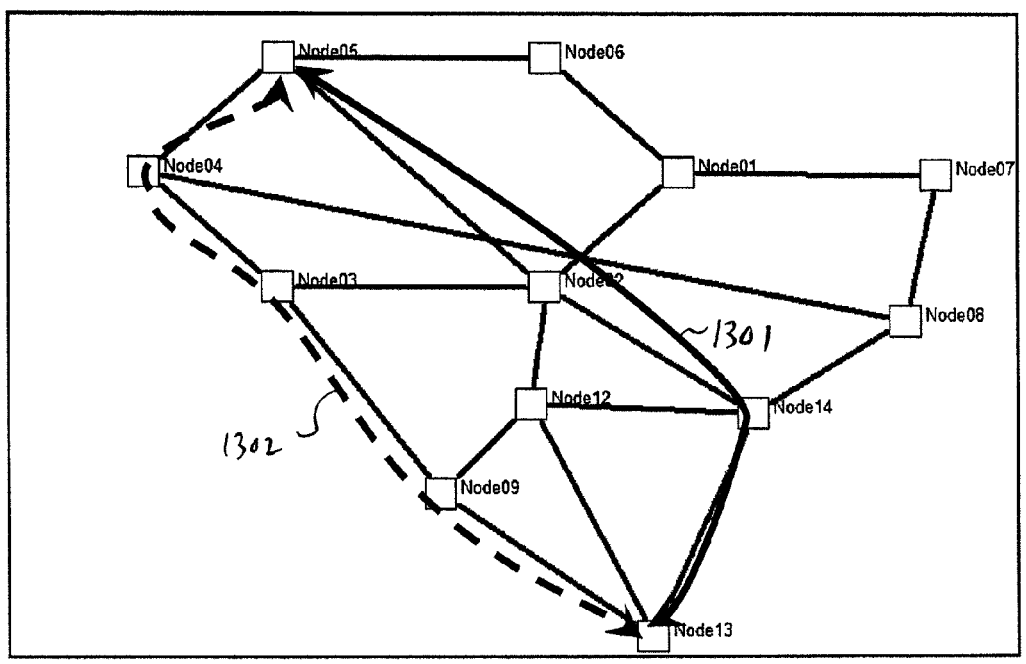
FIG. 13 is still another representation of an example communication network that is constructed and operated in accordance with at least one example embodiment described herein.

Reference will now be made to FIG. 13 to describe an example procedure for ensuring a protection path for IP network traffic. If traffic does not completely fill a link of IP network 900, the unused portion of the bandwidth of the link can be used as a protection path. In some example embodiments, a maximum of 50% of the bandwidth of each link in the IP network 900 may be used for active path traffic and the remaining 50% or less of bandwidth of the link may be used for protection path traffic in the event of a link and/or node failure.

However, this protection technique does not provide any assurance of how many link failures and/or node failures the network 900 can withstand, nor does it allow a service provider to preferentially protect traffic that may require a high availability based on quality of service (QOS) protocols. Therefore, the management server 103 enables a service provider to direct individual traffic flows, so that protection paths can be "reserved" for high priority QOS flows on diverse paths.

With knowledge of individual traffic flows and circuit based IP routing, protection paths can be "reserved" using network planning tools designed for circuit based traffic. For example, as shown in FIG. 13, a predetermined amount of bandwidth along path 1301 may be reserved or designated as an active path for a particular flow and a predetermined amount of bandwidth along path 1302 may be designated as the corresponding protection path for that flow.

Figure 14:
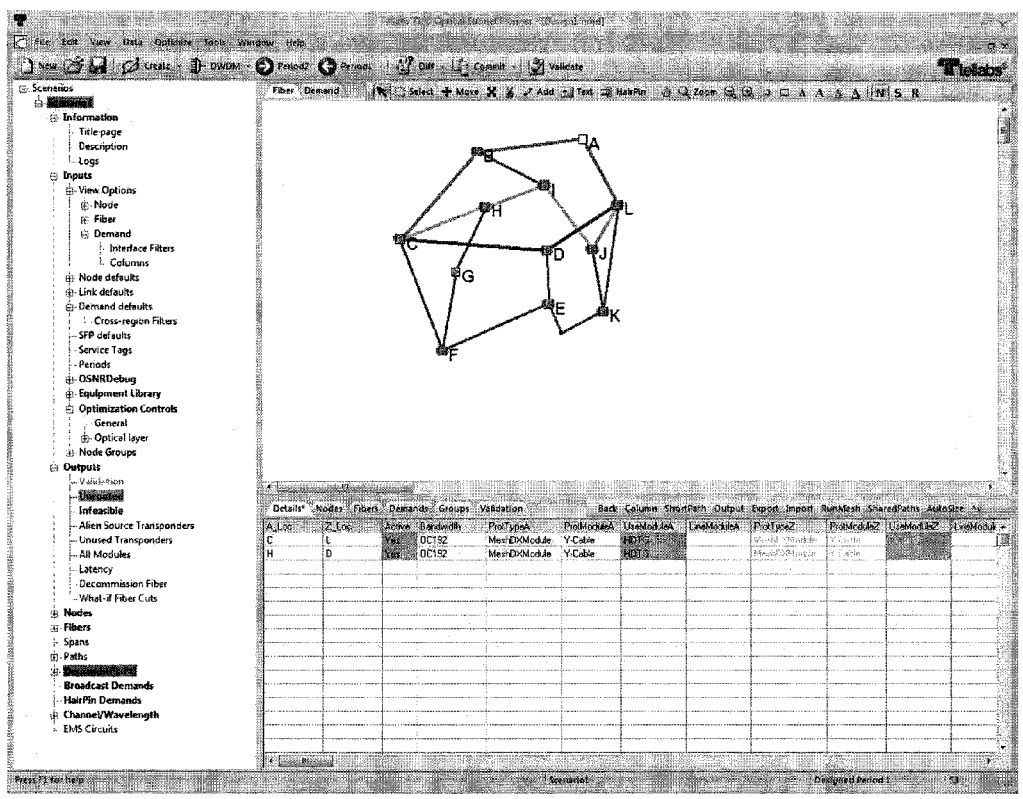
FIG. 14 is a representation of an example user interface of a network modeling tool that is constructed and operated in accordance with at least one example embodiment described herein.
Figure 15:
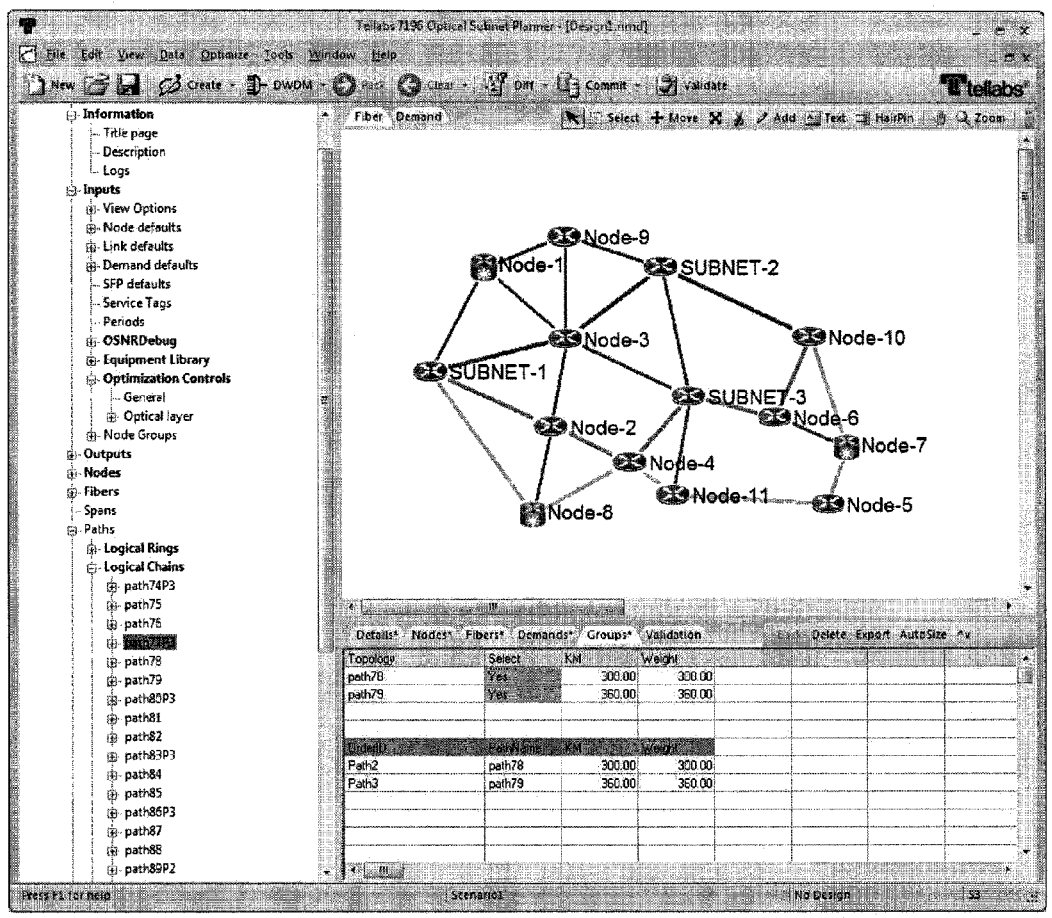
FIG. 15 is a further representation of an example user interface of a network modeling tool that is constructed and operated in accordance with at least one example embodiment described herein.
Figure 16:
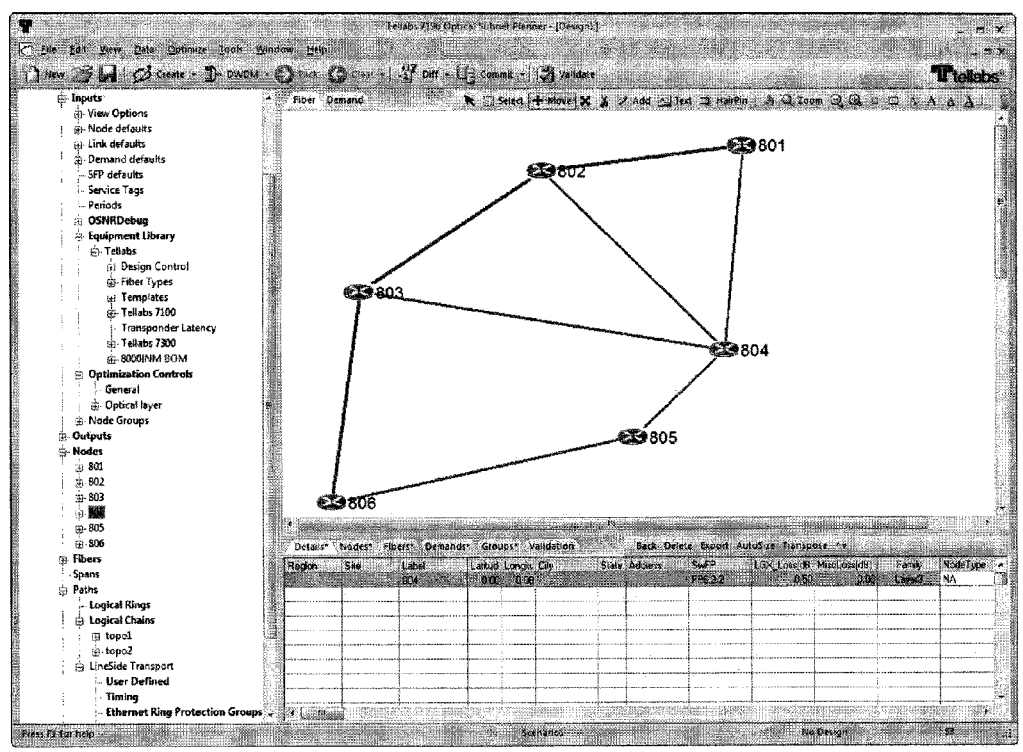
FIG. 16 is another representation of an example user interface of a network modeling tool that is constructed and operated in accordance with at least one example embodiment described herein.

FIGS. 14, 15, and 16 show example user interfaces 1400, 1500, 1600 of a network modeling tool that may be provided by the user device 101. The interfaces 1400, 1500, and/or 1600 enable a service provider to reserve bandwidth by importing traffic flow utilization data from correlation mechanisms and redirecting traffic using circuit-based IP protocols. The service provider may also actively monitor, via the interfaces 1400, 1500, and/or 1600, unused capacity available for protection traffic. If there is a failure, and traffic is rerouted to a protection path, then this traffic may no longer be protected (i.e., there may not be a protection path reserved for this traffic). Because the network modeling tool has the capability to find routes throughout a network, it can dynamically reassess the network and enable the service provider to reserve protection paths for the traffic in the network that has been impacted by a link failure, and can report how resilient the network is to a possible additional subsequent failure.

The example aspects herein provide a procedure, as well as an apparatus, system, and computer program that operate in accordance with the procedure to evaluate a network, such as, for example, an IP network, and to enable simulation of congestion and/or failure of the network, based on bandwidth and/or protection objectives of traffic for each traffic flow, and to reconfigure the network to ensure peak performance.

According to one example aspect herein, the procedure can enable planning and/or simulation of the network based on traffic flows measured through a span of time, such as, for example, a relatively short time window (e.g., hours) or a relatively long time window (e.g., months). For example, the procedure may be performed based on network information obtained over such time periods. In this way, a user may plan the network to accommodate short term traffic patterns and/or long term traffic patterns.

It should be noted that the network configurations represented in FIGS. 1, 2, 5, and 8 through 13 are merely illustrative in nature, and should not be construed as being limiting to the scope of the invention. Also, in other embodiments, the networks may have other configurations than those shown in FIGS. 1, 2, 5, and 8 through 13.

The devices and/or servers described herein may be, in one non-limiting example, a computer or farm of computers that facilitate the transmission, storage, and reception of information and other data between different points. From a hardware standpoint, in one example a server computer will typically include one or more components, such as one or more microprocessors (also referred to as "controllers") (not shown), for performing the arithmetic and/or logical operations required for program execution. Also in one example, a server computer will also typically include disk storage media (also referred to as a "memory"), such as one or more disk drives for program and data storage, and a random access memory, for temporary data and program instruction storage. From a software standpoint, in one example a server computer also contains server software resident on the disk storage media, which, when executed, directs the server computer in performing its data transmission and reception functions. As is well known in the art, server computers are offered by a variety of hardware vendors, can run different operating systems, and can contain different types of server software, each type devoted to a different function, such as handling and managing data from a particular source, or transforming data from one format into another format.

In the foregoing description, example aspects of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine-accessible, computer-readable, and/or machine-readable medium (memory) having instructions. The instructions on the machine-accessible, computer-readable and/or machine-readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium", "computer-readable medium", "machine-readable medium", or "memory" used herein shall include any medium that is capable of storing, encoding, or transmitting a sequence of instructions for execution by the machine and that cause the machine to perform any one of the procedures described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects herein have been described in certain specific example embodiments, many additional modifications and variations would be apparent to those skilled in the art. It is therefore to be understood that the various example embodiments herein may be practiced otherwise than as specifically described. Thus, the present example embodiments, again, should be considered in all respects as illustrative and not restrictive.

What is claimed is:

1. A procedure for evaluating a network that includes nodes and links, with each link connecting two of the nodes, the procedure comprising:
    obtaining, for each link in the network, packet information from each packet transmitted via the link, wherein the packet information includes: a packet ID identifying the packet, a source node ID identifying a source node of the packet, a destination node ID identifying a destination node of the packet, and a bandwidth at which the packet is communicated through the link;
    aggregating the packet information obtained from each packet transmitted via the links in the network to form aggregated packet information;
    executing a correlation algorithm of:
        (i) tracing, based on the aggregated packet information, a traffic flow for each packet through the network, wherein the traffic flow is a path by which the packet travels from the source node to the destination node through the network and includes one or more links, and
        (ii) logging, for each traffic flow, traffic flow information including a bandwidth of the traffic flow in each of the one or more of the links in the path; and
    determining an aggregate bandwidth utilization for each link in the network, wherein the aggregate bandwidth utilization for each link is a sum of bandwidths of traffic flows in the link.

2. The procedure of claim 1, wherein the nodes include at least one network element, and
    wherein the network includes an element management system.

3. The procedure of claim 2, wherein the network element includes at least one of a wireless base station, a router, a server, a base station controller, or a radio network controller.

4. The procedure of claim 1, wherein the packet information obtained, in the obtaining step, from each packet further includes link information identifying a link.

5. The procedure of claim 1, wherein the traffic flow information for each traffic flow further includes information identifying at least one of: a source node for the traffic flow, a destination node for the traffic flow, or the one or more of the links included in the path for the traffic flow.

6. The procedure of claim 1, wherein the packet information is obtained, in the obtaining step, from a corresponding packet header for the packet.

7. The procedure of claim 1,
    wherein the path includes a plurality of the links, and
    wherein the tracing includes determining whether a traffic flow is bifurcated by comparing the bandwidths of the traffic flow in the plurality of the links in the path to each other.

8. The procedure of claim 2, further comprising: obtaining network configuration information from at least one of the nodes or the element management system.

9. The procedure of claim 1, further comprising:
    determining a bandwidth capacity currently available for each link in the network based on the aggregated bandwidth utilization for each link in the network.

10. The procedure of claim 1, further comprising: executing one or more planning or simulation algorithms based on at least one of the aggregated packet information, the aggregate bandwidth utilization for each of the links, or the traffic flow information for each traffic flow.

11. A system for evaluating a network, the system comprising:
    at least one apparatus arranged to:
        obtain, for each link in the network, packet information from each packet transmitted via the link, wherein the packet information includes: a packet ID identifying the packet, a source node ID identifying a source node of the packet, a destination node ID identifying a destination node of the packet, and a bandwidth at which the packet is communicated through the link;
        aggregate the packet information obtained from each packet transmitted via the links in the network to form aggregated packet information;

execute a correlation algorithm of:
(i) tracing, based on the aggregated packet information, a traffic flow for each packet through the network, wherein the traffic flow is a path by which the packet travels from the source node to the destination node through the network and includes one or more links, and
(ii) logging, for each traffic flow, traffic flow information including a bandwidth of the traffic flow in each of the one or more of the links in the path; and determine an aggregate bandwidth utilization for each link in the network, wherein the aggregate bandwidth utilization for each link is a sum of the bandwidths of the traffic flows in the link.

12. The system of claim 11, wherein the nodes include at least one network element, and
wherein the network includes an element management system.

13. The system of claim 12, wherein the network element includes at least one of a wireless base station, a router, a server, a base station controller, or a radio network controller.

14. The system of claim 11, wherein the packet information for each packet further includes link information identifying a link.

15. The system of claim 11, wherein the traffic flow information for each traffic flow includes information identifying at least one of: the source node for the traffic flow, the destination node for the traffic flow, or the one or more of the links included in the path for the traffic flow.

16. The system of claim 11, wherein the at least one apparatus is arranged to obtain the packet information from a corresponding packet header for the packet.

17. An apparatus for planning and/or simulating an Internet Protocol (IP) network, the apparatus comprising:
at least one communication interface arranged to:
(i) interface with a network that includes nodes and links, with each link connecting two of the nodes, and
(ii) obtain, for each link in the network, packet information from each packet transmitted via the link, wherein the packet information includes: a packet ID identifying the packet, a source node ID identifying a source node of the packet, a destination node ID identifying a destination node of the packet, and a bandwidth at which the packet is communicated through the link; and at least one processor arranged to:
aggregate the packet information obtained from each packet transmitted via each link in the network to form aggregated packet information; and
execute a correlation algorithm of:
(i) tracing, based on the aggregated packet information, a traffic flow for each packet through the network, wherein the traffic flow is a path by which the packet travels from the source node to the destination node through the network and includes one or more links, and
(ii) logging, for each traffic flow, traffic flow information including a bandwidth of the traffic flow in each of the one or more of the links in the path, and determine an aggregate bandwidth utilization for each link in the network, wherein the aggregate bandwidth utilization for each link is a sum of bandwidths of the traffic flows in the link.

18. A non-transitory computer readable medium having stored thereon sequences of instructions, the sequences of instructions comprising instructions, when, executed by a computer system, cause the computer system to:
obtain, for each link in a network that includes nodes and links with each link connecting two of the nodes, packet information from each packet transmitted via the link, wherein the packet information includes: a packet ID identifying the packet, a source node ID identifying a source node of the packet, a destination node ID identifying a destination node of the packet, and a bandwidth at which the packet is communicated through the link;
aggregate the packet information obtained from each packet transmitted via the links in the network to form aggregated packet information;
execute a correlation algorithm of:
(i) tracing, based on the aggregated packet information, a traffic flow for each packet through the network, wherein the traffic flow is a path by which the packet travels from the source node to the destination node through the network and includes one or more links, and
(ii) logging, for each traffic flow, traffic flow information including a bandwidth of the traffic flow in each of the one or more of the links in the path; and
determine an aggregate bandwidth utilization for each link in the network, wherein the aggregate bandwidth utilization for each link is a sum of the bandwidths of the traffic flows in the link.

* * * * *